(12) United States Patent
Kilabarda

(10) Patent No.: US 6,799,673 B2
(45) Date of Patent: Oct. 5, 2004

(54) VERSAROLL OVERHEAD CONVEYOR SYSTEM

(75) Inventor: Velibor Kilabarda, Birmingham, MI (US)

(73) Assignee: Progressive Tool & Industries Co., Southfield, MI (US)

(*) Notice: Subject to any disclaimer, the term of this patent is extended or adjusted under 35 U.S.C. 154(b) by 0 days.

(21) Appl. No.: 10/225,291

(22) Filed: Aug. 22, 2002

(65) Prior Publication Data

US 2003/0079964 A1 May 1, 2003

Related U.S. Application Data

(60) Provisional application No. 60/369,310, filed on Apr. 2, 2002, and provisional application No. 60/329,197, filed on Oct. 12, 2001.

(51) Int. Cl.[7] .............................................. B65G 29/00
(52) U.S. Cl. ..................................... 198/465.4; 104/168
(58) Field of Search ............................. 198/465.4, 780, 198/781.01, 781.02–781.11, 867.13; 104/172.4, 168

(56) References Cited

U.S. PATENT DOCUMENTS

| | | | |
|---|---|---|---|
| 3,735,710 A | * | 5/1973 | Hickman .................. 104/168 |
| 4,584,944 A | | 4/1986 | Dehne |
| 4,936,222 A | | 6/1990 | Murai |
| 5,083,655 A | | 1/1992 | Becker |
| 5,341,916 A | | 8/1994 | Doane et al. |
| 5,709,152 A | | 1/1998 | Ohara et al. |
| 5,839,371 A | | 11/1998 | Knuttel |
| 5,927,481 A | * | 7/1999 | Engman et al. ......... 198/867.13 |
| 5,996,771 A | | 12/1999 | Estes |
| 6,138,574 A | | 10/2000 | Zaguroli, Jr. |

FOREIGN PATENT DOCUMENTS

| | | |
|---|---|---|
| FR | 2 263 176 | 10/1975 |
| GB | 1 573 302 A | 8/1980 |
| GB | 2 346 863 A | 8/2000 |
| WO | WO 00/26121 | 5/2000 |

* cited by examiner

*Primary Examiner*—Richard Ridley
(74) *Attorney, Agent, or Firm*—Young & Basile, P.C.

(57) ABSTRACT

An overhead conveyor or transport system is disclosed where at least one carriage is supported on a plurality of rollers rotatably mounted in fixed overhead locations spaced along a path of travel. At least one motor is provided for driving a portion of the plurality of rollers in rotation along at least one segment of the path of travel. Each carriage has at least one elongate support member operably engagable with the rollers for movement along the path of travel in response to rotation of the rollers. The elongate support member is continuously engagable with at least two rollers simultaneously while the corresponding carriage is moved along the path of travel. Each carriage or carrier hangs downwardly below the rotational axis of the overhead rollers.

46 Claims, 17 Drawing Sheets

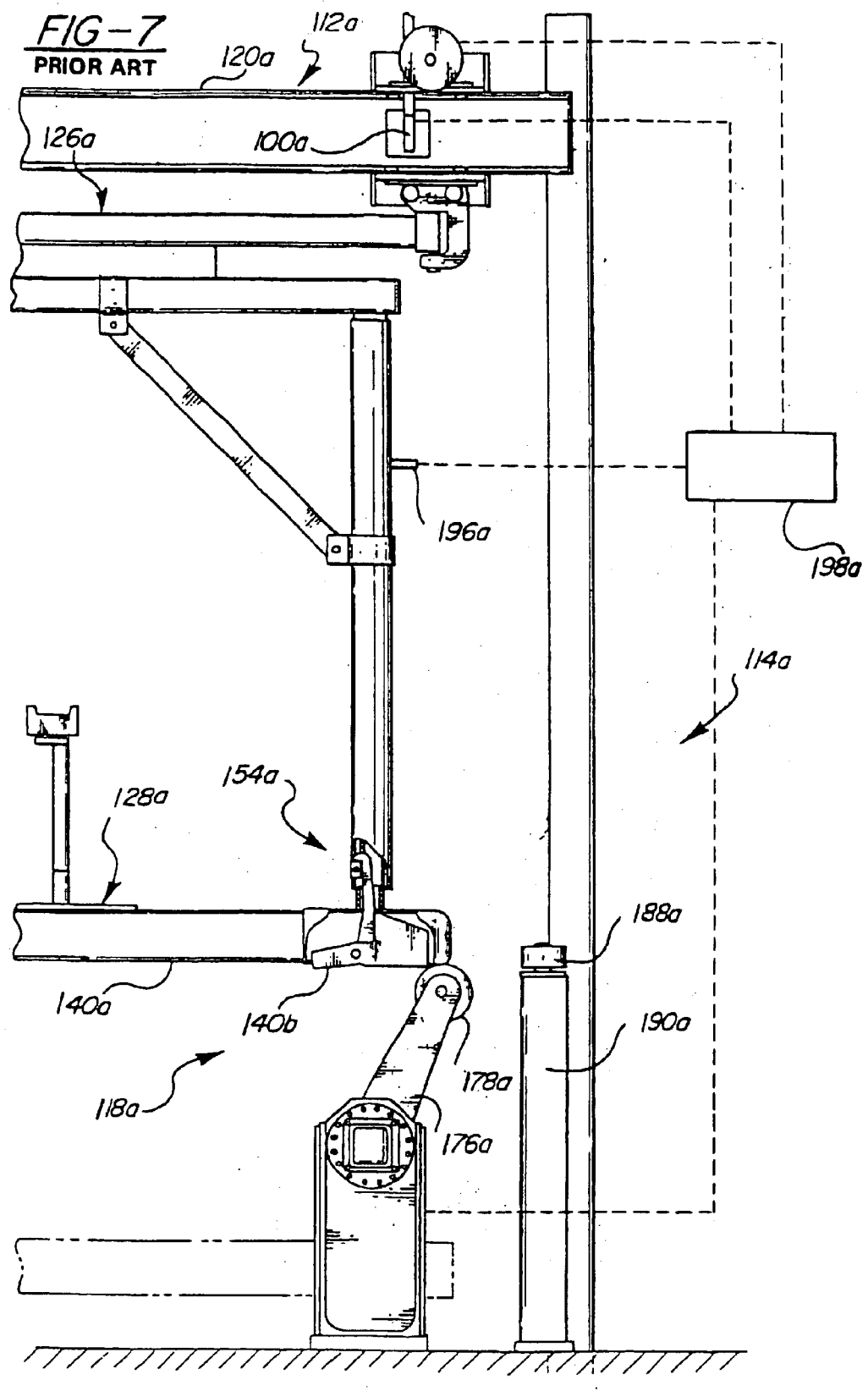

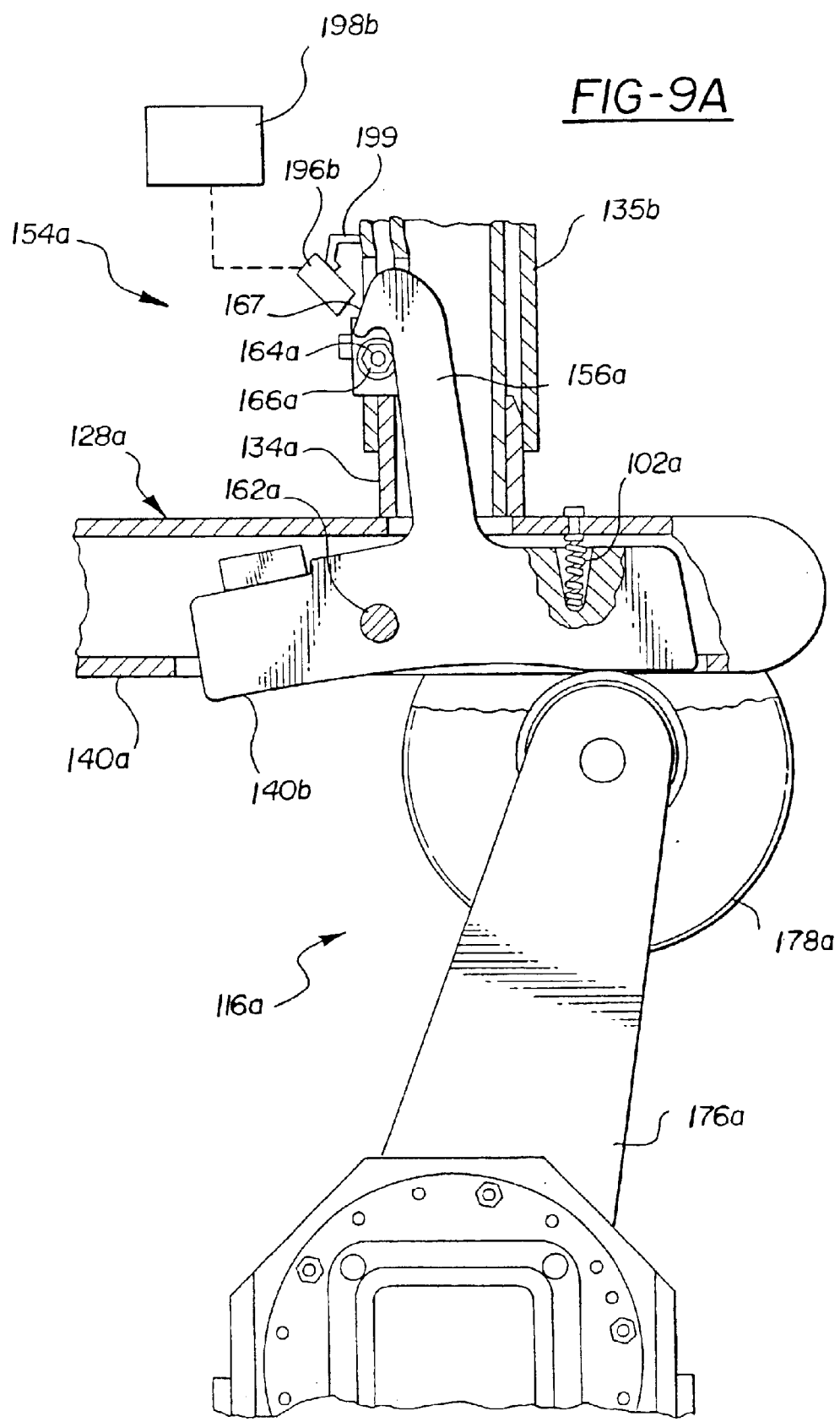

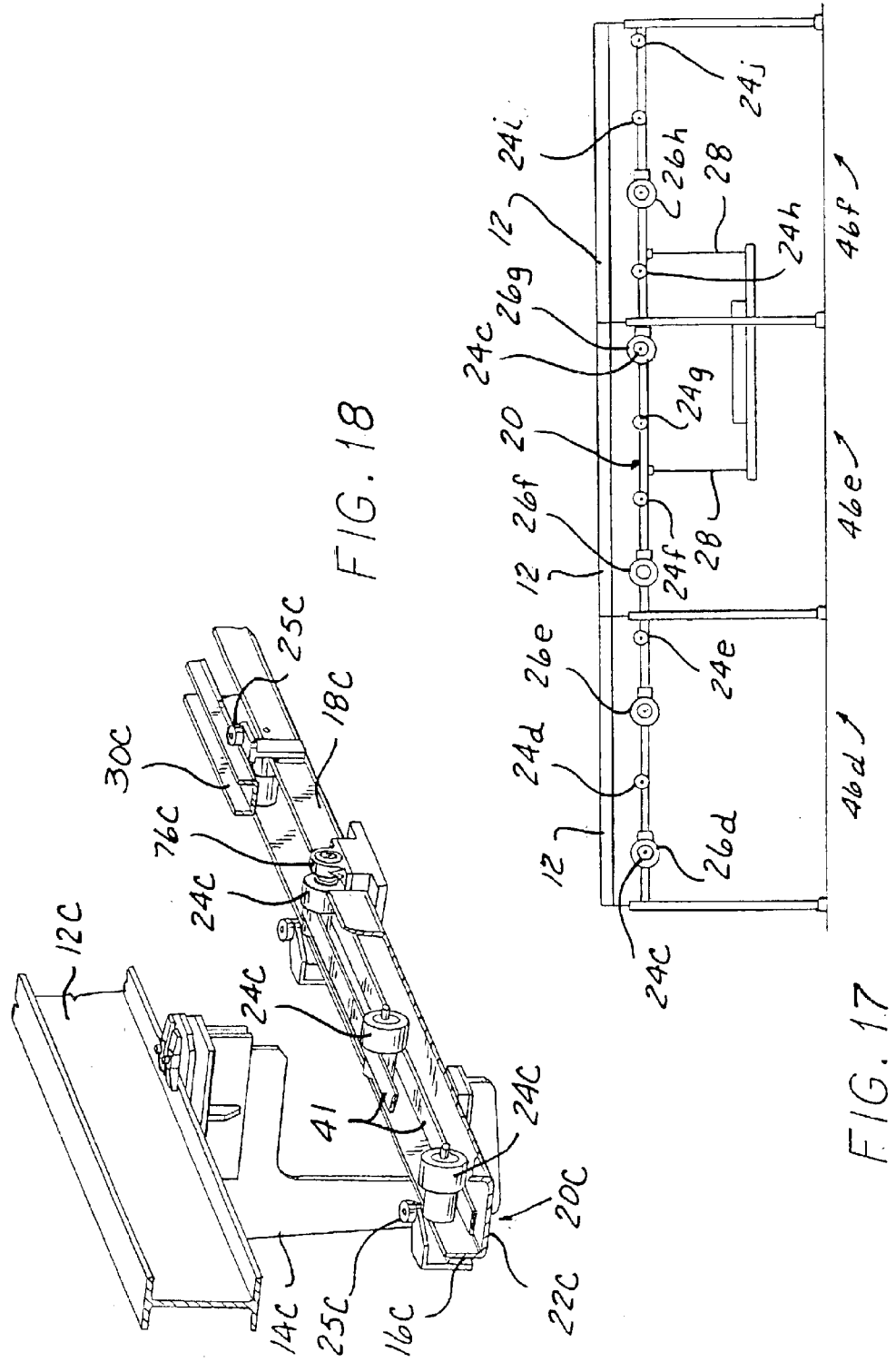

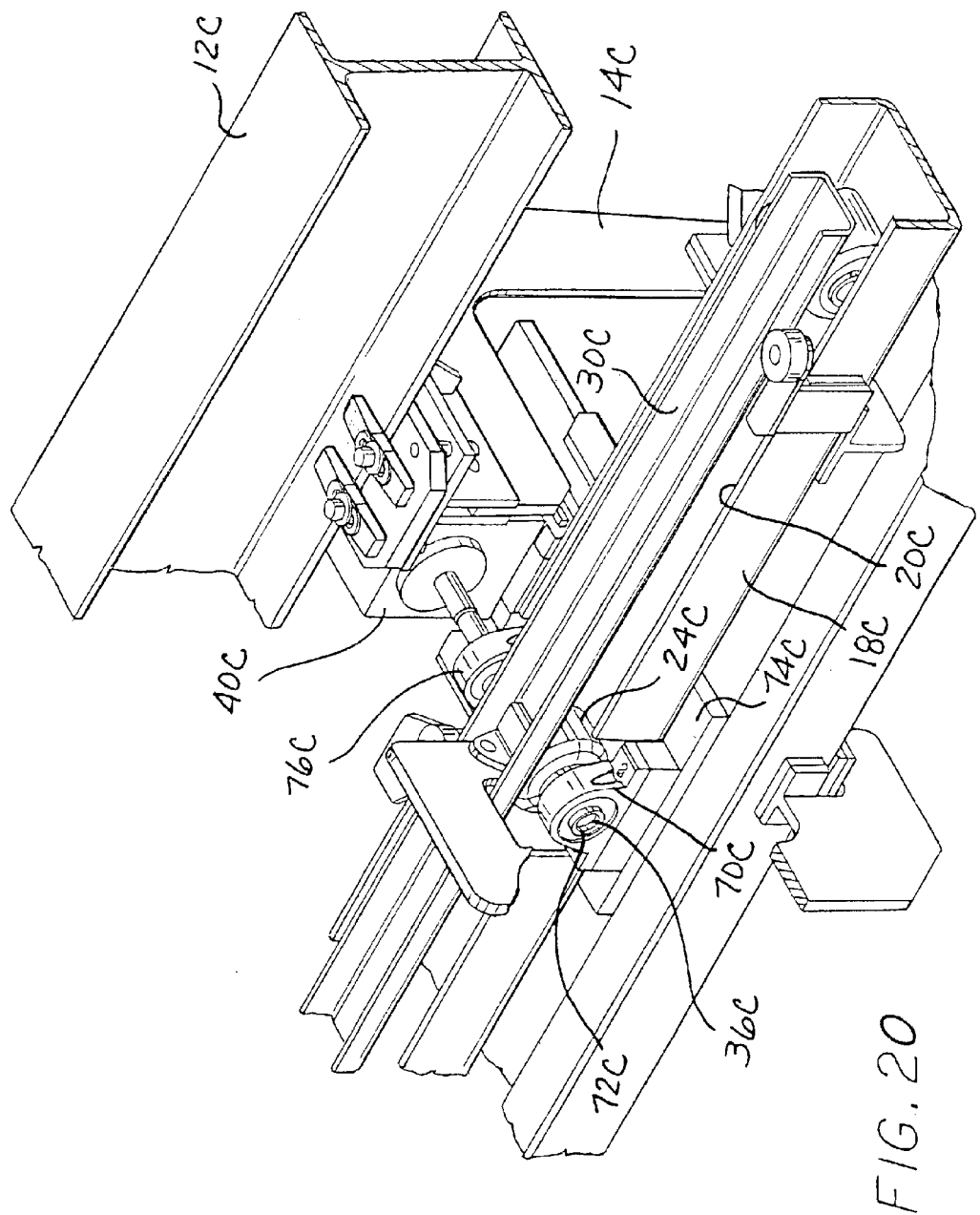

US 6,799,673 B2

VERSAROLL OVERHEAD CONVEYOR SYSTEM

CROSS-REFERENCE TO RELATED APPLICATIONS

This application is a continuation of Provisional Patent Application U.S. Ser. No. 60/369,310, filed Apr. 2, 2002 and a continuation of Provisional Patent Application of U.S. Ser. No. 60/329,197 filed Oct. 12, 2001.

FIELD OF THE INVENTION

The present invention pertains generally to assembly systems, particularly of the type including conveyors defining a path of travel for transporting a workpiece between workstations, and more particularly the present invention pertains to an overhead conveyor system.

BACKGROUND OF THE INVENTION

In automotive production lines, it is generally known to transport individual workpieces, such as automotive body panels, frame components, etc., to and between workstations where selected operations, such as welding, are performed by workers, robots, or other processing equipment. Transporting individual workpieces to, and accurately placing the workpieces at, a desired workstation on a production line poses numerous difficulties. Tooling and other processing equipment at a workstation create obstacles to be avoided by the incoming and departing workpieces. After reaching any given workstation, the workpieces need to be accurately positioned within the workstation so that the necessary processing operations can be performed. The efficiency considerations of modern production lines and the like demand that workpiece delivery to a workstation be as rapid as possible.

In many common production lines and other assembly applications, workpieces are transported along an overhead rail, for instance a monorail. Motor-driven trolleys travel along the rail to and between various workstations. Electrical conductors can be provided along the rail to provide power to the trolley motors mounted on each carriage. The carriages carry workpieces along the path defined by the rail for delivering the workpieces to the various workstations.

Prior known conveyor systems typically use an electrified monorail system (EMS) with intelligent carriers. Performance characteristics of this type of electrified monorail system with one wheel drive typically vary inversely with respect to mass and speed. As the mass to be conveyed increases, typically the speed of transfer decreases. A typical electrified monorail system configuration provides a transfer cycle time for 24 feet of movement in 9.5 seconds, carrier stopping accuracy within plus or minus 2.0 millimeters, and a carrier capacity of up to 2000 lbs. The electrified monorail systems include an electrified rail with bus bars and intelligent carriers with on board microprocessors. Overhead carrier positioning is accomplished with switches and an overhead carrier control box. This type of system requires alignment between adjacent portions of the rail and adjacent portions of the electrical bus bars. Durability of the electrified monorail system is dependant on the life of the electrical brushes or contacts, wear of the electrical bus at connections, and wear of the carrier trolley wheels. Off center loads require side guide rollers and hanger assembly for the carriers of an electrified monorail systems. Each carrier has an on board processor. The carrier positioning switches are typically overhead mounted and zone cuts or controls are predetermined and not easily modified. The length of an electrified monorail system is typically enlarged due to the requirement of enter and exit stations adjacent to any curves in the transport line. A workstation width is typically less than 50 feet while station height is approximately 16½ feet. Each carriage typically includes single roller braking. Carrier positioning switches are typically located in overhead locations. New model carrier set up on an electrified monorail system requires additional carriers with controls and a carrier insert/removal facility. Coordination is required between the carrier trolley (i.e. facility source) and the carrier with antler (i.e. tooling source). All carriers require programming for each intelligent carrier being replaced with the new model setup.

SUMMARY OF THE INVENTION

It would be desirable in the present invention to provide an overhead conveyor system that would overcome the deficiencies of the previously known electrified monorail system. The present invention includes a high speed overhead power roll system. The high speed overhead power roll system provides transfer cycle time for 24 feet of movement in approximately 6.5 seconds. The carrier stopping accuracy with the versaroll overhead monorail system is plus or minus 1.5 millimeters. The load carrying capacity of the carrier of the versaroll overhead monorail system is 3000 lbs. The overhead conveyor system according to the present invention includes overhead power rollers and are connected with belts for transferring rotary motion along connected segments of adjacent rollers. According to the present invention, the carrier is provided without controls mounted on the carrier. However, a passive radio frequency tag could be provided on the carrier if desired without requiring power input through the carrier. Along aligned linear segments of the path of travel of each carrier, the power rolls are aligned with one another and interconnected with belts for driving the interconnected rollers with a single motor. Preferably, each motor located at a workstation along the path of travel is a variable frequency reversible drive or servo drive, while return loops can use standard electric drives with starters. A support member for each carrier operably engages with the complementary rollers to provide built-in compliance. In the preferred embodiment, a round support member or pipe operably engages with complementary round concave surfaces formed on the rollers. The present invention provides multiple wheel engagement when accelerating and/or decelerating. The present invention eliminates exposed electrical contacts as required in the prior known electrified monorail system. The carrier requires no on board power or processor systems, since the carrier latch can be checked externally prior to leaving any workstation. All variable frequency drives are mounted with corresponding control panels at associated workstations. The present invention combines entrance and exit stations of each curve into a single turntable with high speed rotary table permitting shortening of the overall line length by approximately 2 turning radiuses. The estimated height of each station, according to the present invention is approximately 16 feet, since no clearance is required for carrying a motor on the top of each carrier. The only electrical component with limited accessibility according to the present invention are the power roll motors which are mounted on the overhead rail system and the belts extending between adjacent power rollers. All carrier positioning switches are located at the floor level for easy accessibility and maintenance. Fewer components according to the present invention require safety wiring. The carrier assembly according to the present invention is a single welded carrier unit. New model carrier setup requires additional carriers and associated workstation controls, and a carrier insert/removal facility. Each carrier can be validated at the tool shop. Simple logic setup can be provided to manipulate multiple model selectivity lines with table indexing. Simple welded construction carriers can be provided so that robot utilization can be increased as a result of the faster transfer rate of approximately 6.5 seconds for 24 feet.

An overhead conveyor system according to the present invention provides a plurality of rollers rotatably mounted in fixed locations spaced along a path of travel. At least one motor drives at least a portion of the plurality of rollers in rotation through a series of interconnected belts extending between adjacent rollers along at least a predetermined segment of the path of travel. At least one carriage is supported on the rollers for movement along the path of travel in response to rotation of the rollers. Each carrier has at least one elongate member continuously engagable with at least two rollers simultaneously while the carriage moves along the path of travel. Each roller is operably connected to a common shaft with a first pulley and a second pulley. A plurality of belts are engaged between adjacent rollers connecting the first or second pulley of one roller with the corresponding first or second pulley of an adjacent roller for transmitting rotation from a single motor to the plurality of rollers along the segment of the path of travel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a side elevational view of the preferred embodiment of a lowerator according to the present invention;

FIGS. 9A–9C are detailed cross-sectional illustrations of the latch mechanism and actuator of the preferred embodiment of the lowerator according to the present invention;

FIG. 17 is a schematic view of two workstations adjacent to one another with a plurality of motors according to the present invention;

FIG. 18 is a detailed view of the upper roller drive and carriage support assembly according to an embodiment of the present invention where a belt is operably associated with more than two rollers;

FIG. 20 is detailed view of the upper drive and carriage support assembly according to the present invention.

DESCRIPTION OF THE PREFERRED EMBODIMENT

Figure 1:
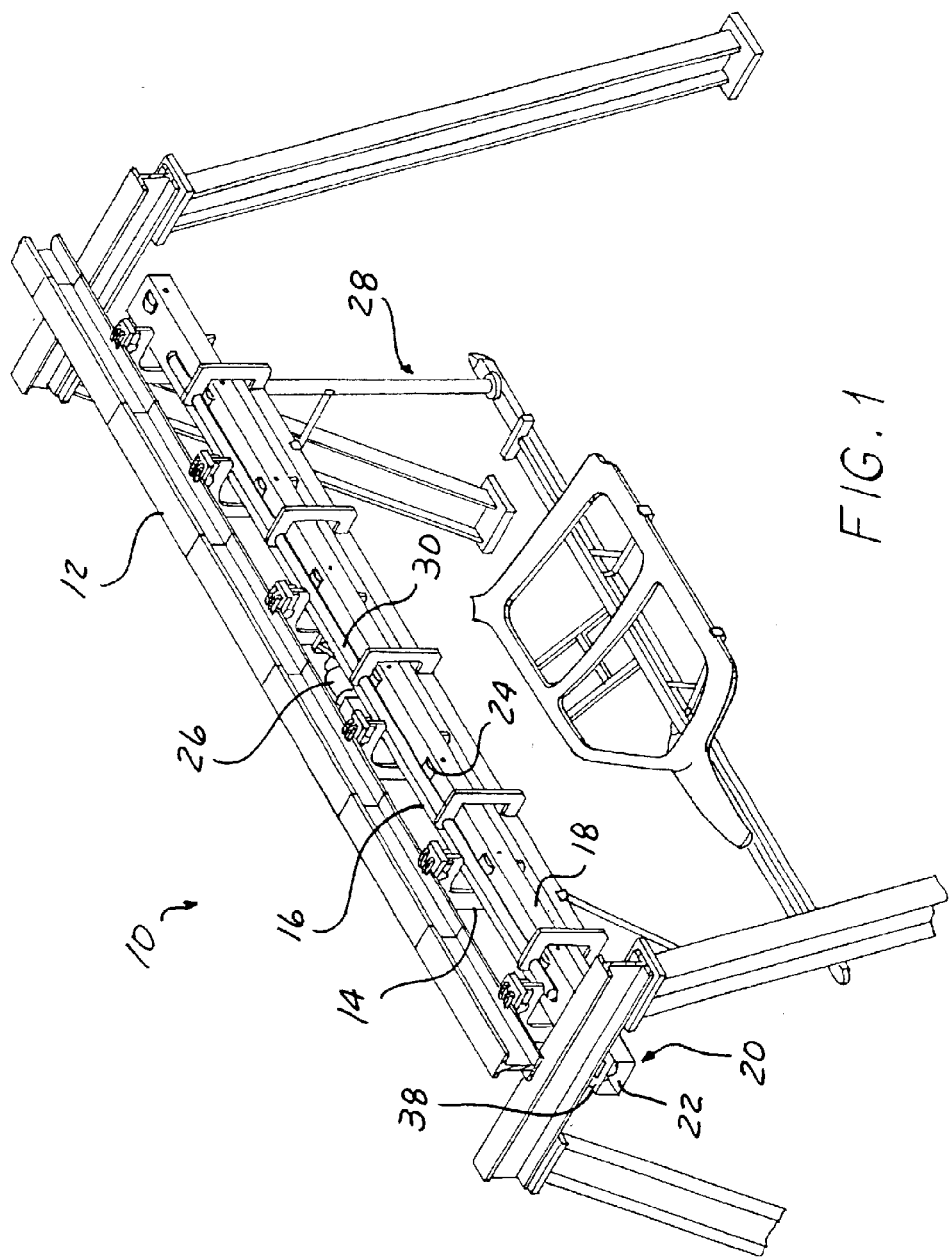
FIG. 1 is a perspective view of an overhead conveyor system according to the present invention.

Various embodiments of the present invention are shown throughout the figures. The figures include common elements in different structural configurations. Common elements are designated with a common base numeral and differentiated with an alphabetic designation.

Referring now to FIGS. 1–4, an overhead conveyor system 10 according to the present invention includes an overhead support frame 12 of any configuration suitable for supporting the loads to be transported along the path of travel and allowing sufficient clearance for the work pieces to be processed. The support frame structures are conventional and well known to those skilled in the art. The frame 12 through appropriate brackets 14 support opposing sidewalls 16, 18 defining a channel or slot therebetween. In the preferred embodiment, the opposing walls 16, 18 can be part of a U-shaped channel 20 supported by the brackets 14 along a lower wall 22 extending between the opposing walls 16, 18 to define an open upper end extending along the entire longitudinal length of the U-shaped channel 20. The U-shaped channel 20 defines a path of travel for the overhead conveyor system 10. A plurality of rollers 24 are rotatably mounted in fixed locations spaced along the path of travel. At least one motor 26 is provided for driving at least a portion of the plurality of rollers 24 in rotation. At least one carriage or carrier 28 is supported on the plurality of rollers 24 for movement along the path of travel in response to rotation of the rollers 24 by the motor 26. Each carriage or carrier 28 has at least one elongate support member 30 extending along at least a portion of the longitudinal length of the carriage or carrier between the upstream end and the downstream end of the carriage. The at least one elongate support member 30 is continuously engagable with at least two rollers 24 simultaneously while the supported carriage 28 moves along the path of travel.

Figure 5:
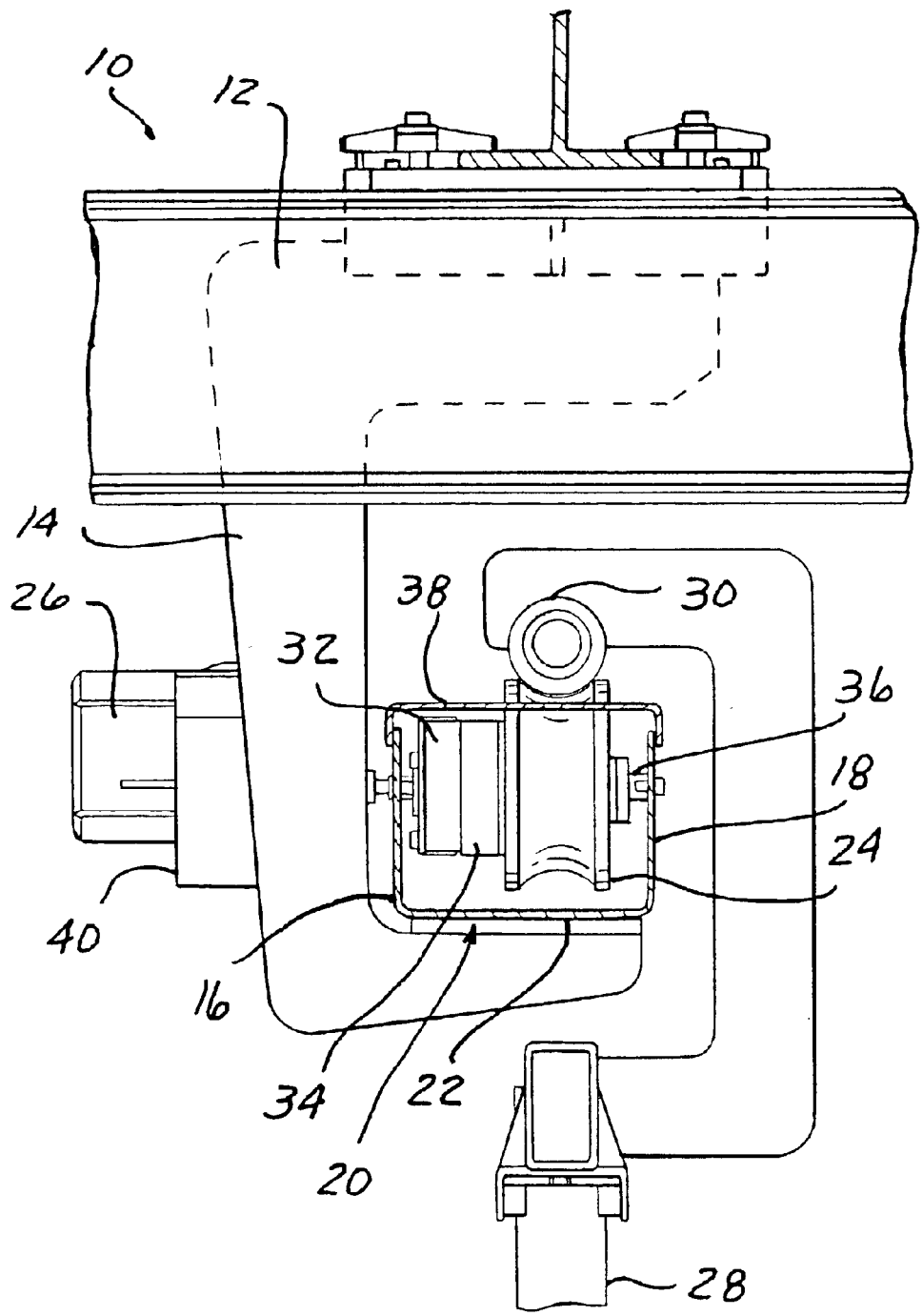
FIG. 5 is a detailed view of the upper roller drive and carriage support assembly according to the present invention.
Figure 6:
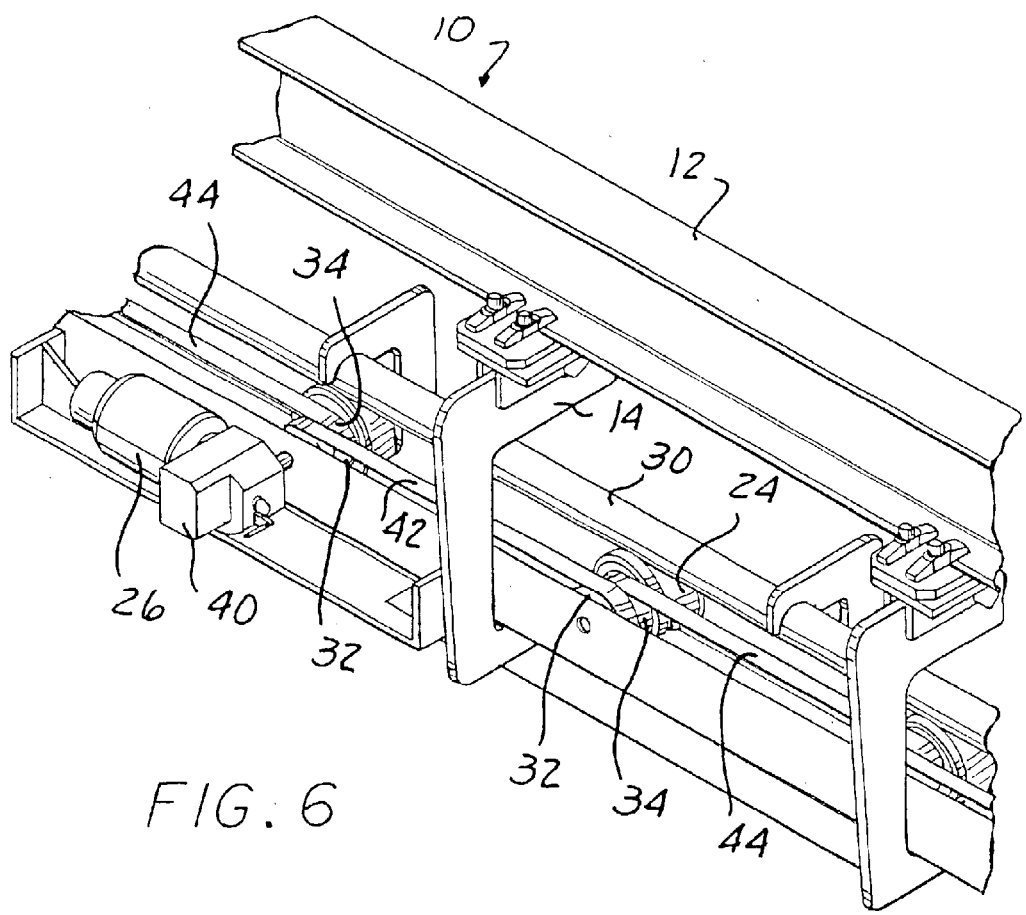
FIG. 6 is a detailed perspective view of a drive configuration of the overhead conveyor system according to the present invention.

Referring now to FIGS. 5 and 6, each roller 24 is operably connected to a first pulley 32 and a second pulley 34 for simultaneous rotation about a common axis defined by shaft 36. Shaft 36 is supported by opposing walls 16, 18 of the open top U-shaped channel 20. A cover 38 can be provided for enclosing a substantial portion of the open top U-shaped channel 20 while allowing the upper portion of each roller 24 to extend through the cover for engagement with the elongate support member 30 of each carriage or carrier 28. As best seen in FIG. 6, the motor 26 through an appropriate gear box or transmission 40 drives one of the rollers 24 and associated first pulley 32 and second pulley 34 in simultaneous rotation about a common axis. A first drive belt 42 engages with the first pulley 32 driven by the motor 26 and transfers rotational motion to an adjacent first pulley 32 connected to another second pulley 34 and roller 24 for simultaneous rotation about another common axis spaced longitudinally from the rotational axis of the first mentioned motor driven pulley. A second drive belt 44 extends from the second pulley 34 of this roller combination for engagement with a second pulley spaced further longitudinally from the drive motor 26. The series of interconnected first and second drive belts 42, 44 extend between adjacent roller assemblies to operably engage with corresponding first and second drive pulleys 32, 34 to transfer the rotational motion of the motor 26 along at least a portion or segment of the path of travel of the overhead conveyor system 10 according to the present invention. Preferably, the motor 26 is a variable frequency reversible drive capable of transporting a carriage or carrier 28 at the desired speed when loaded with a workpiece to be conveyed along the path of travel. One or more motors 26 can be disposed along the longitudinal length of the path of travel for separate independent control of the carriers as the carriers move between one or more workstations located along the path of travel.

Referring again to FIGS. 5 and 6, the support members 30 can be any desired cross-sectional configuration. In a preferred embodiment, the support member 30 includes an exterior surface engagable with a complementary exterior surface of each roller 24. Preferably, the support member 30 is in the form of an elongate hollow cylindrical member extending along a substantial portion of the longitudinal length of the corresponding carrier 28. A portion of the exterior cylindrical surface of the support member 30 operably engages with a corresponding, generally complementary concave surface formed on the exterior of the roller 24. The combination of the exterior cylindrical surface of the support member 30 and the generally complementary concave surface on the exterior of the roller provides a self righting function to the carrier 28 in order to center the carrier 28 vertically about the longitudinal axis of the support member 30. In other words, any rocking motion transverse to the path of travel is dampened and the carrier 28 is redirected toward a stable centered position as the carrier 28 continues to move along the path of travel.

Figure 2:
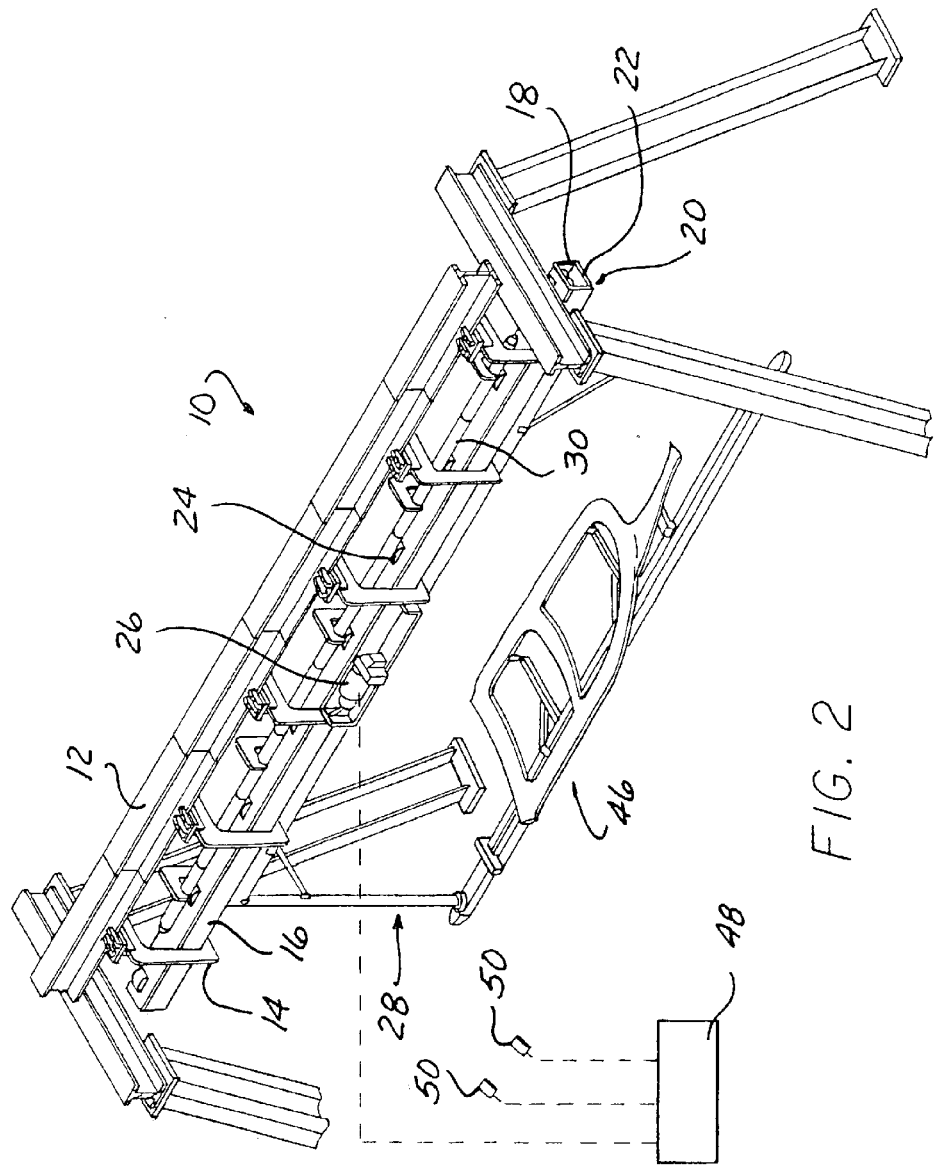
FIG. 2 is a perspective view from an opposite side of the overhead conveyor system according to the present invention.
Figure 3:
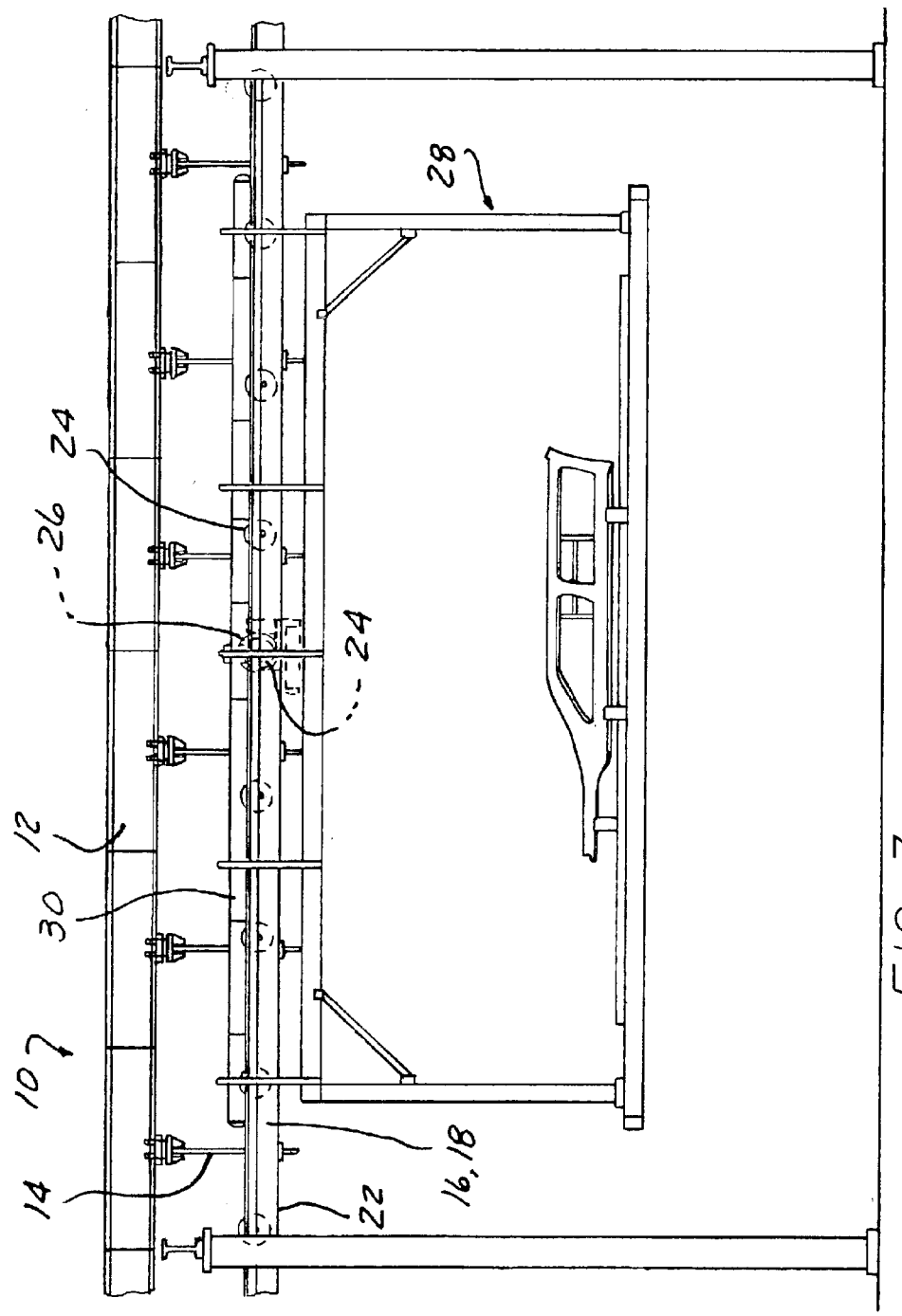
FIG. 3 is a side elevational view of the overhead conveyor system.
Figure 4:
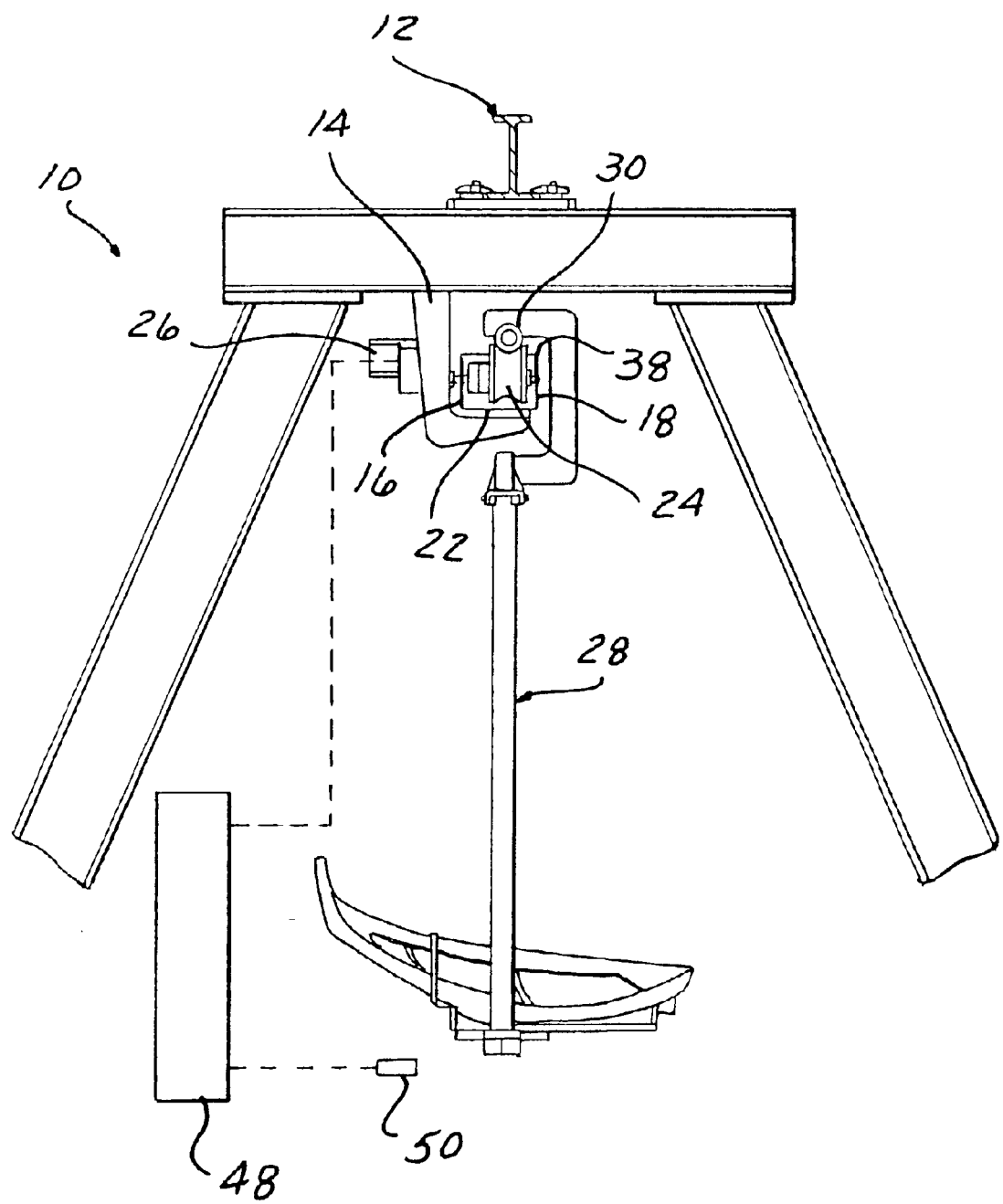
FIG. 4 is a cross-sectional elevational view of the overhead conveyor system according to the present invention.

Referring now to FIGS. 2 and 4, at least one workstation 46 can be provided along the path of travel of the overhead conveyor system 10. The variable frequency drive motor 26 for this segment of the overhead conveyor system can be controlled by a controller 48 schematically illustrated in these figures in response to one or more sensors 50, schematically illustrated in these figures. The sensors can be positioned at floor level along with any control panel required for the controller 48 for ease of maintenance. The sensors 50 can be positioned adjacent the entry to the workstation 46 for signaling the controller 48 to slow the variable frequency drive motor 26 as the carrier 28 enters the workstation 46. Additional sensors can be appropriately positioned in order to accurately stop the carrier 28 at the desired position at the workstation 46.

The carriage or carrier 28 can include a generally horizontal member extending between two vertically extending and telescoping support members. The horizontal support member can support interchangeable antlers for carrying various configurations of workpieces between the workstations for processing. The horizontal member and antlers can be moved from a raised, transport position, to a lowered processing position when stopped at the workstation. Additional details regarding the structural configuration and operation of the lower portion of the carriage or carrier 28 can be obtained from the disclosure of U.S. Ser. Nos. 09/767,931, 09/767,929, and 09/768,090 all filed on Jan. 23, 2001 which are incorporated herein by reference.

Figure 8:
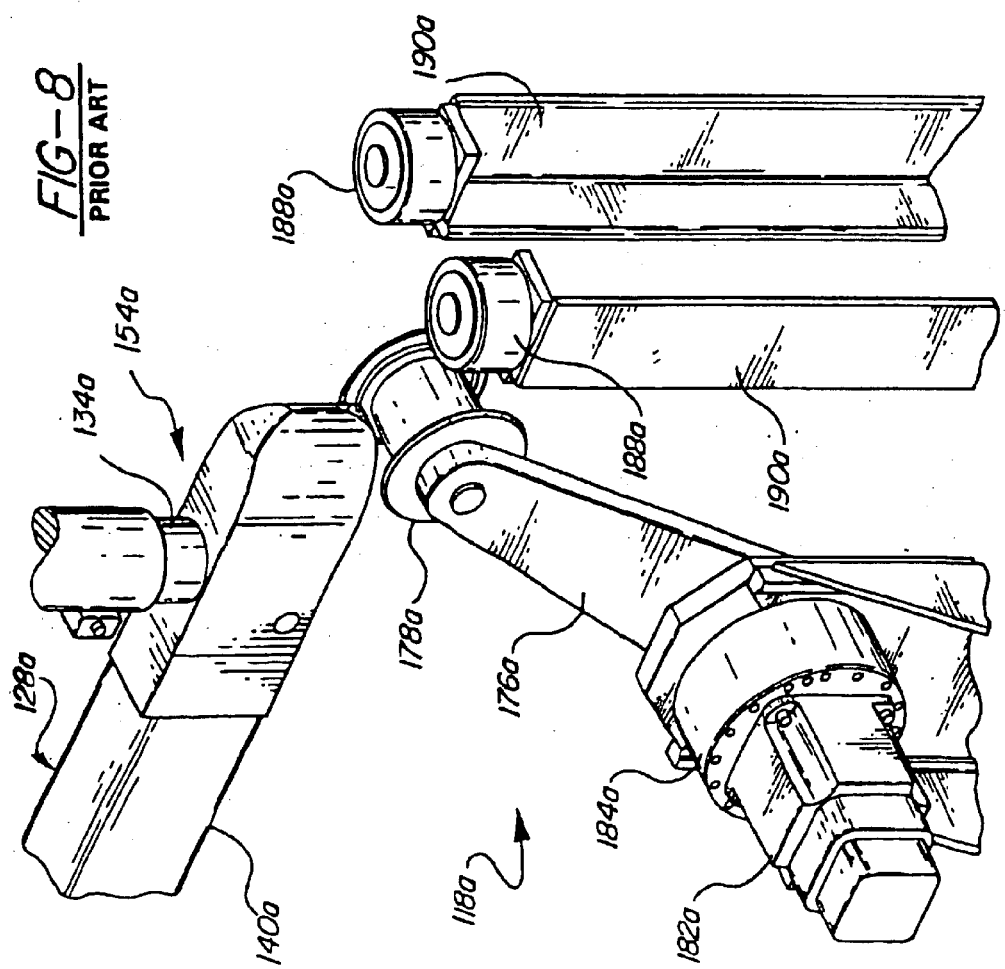
FIG. 8 is a detailed perspective view of the preferred embodiment of the lowerator according to the present invention.

Referring now to FIGS. 7–11, and more particularly FIGS. 7 and 8, the preferred embodiment of a lowerator 118*a* according to the present invention is illustrated. The present invention discloses an apparatus for transporting at least one workpiece along at least one rail 120*a* defining a path 112*a* of travel through a workstation 114*a*. While the present invention preferably includes a single electric monorail overhead system, the invention contemplates application to other known configurations of workpiece conveyors including multi-rail, both electric and non-electric, or non-electric monorail configurations. In the preferred configuration, a trolley 126*a* is movable along the rail 120*a* and is controllable to stop at the workstation 114*a* by appropriate switches and/or sensors and control circuitry as is known to those skilled in the art. A carrier 128*a* is connected to the trolley 126*a* for supporting at least one workpiece during movement of the trolley 126*a* along the rail 120*a* with respect to the workstation 114*a*. The carrier 128*a* is movable between a raised position, illustrated in FIGS. 7 and 8, and a lowered position, shown in phantom in FIG. 7, when positioned at the workstation 114*a*. At least one latch 154*a* is provided for maintaining the carrier 128*a* in the raised position with respect to the trolley 126*a* when the latch 154*a* is in the locked position. The latch 154*a* allows movement of the carrier 128*a* to the lowered position when the latch 154*a* is in the released position. An actuator 116*a* is provided for each latch 154*a*. Each actuator 116*a* is movable from a first position to a second position. As the actuator moves from the first position to the second position, the actuator 116*a* engages the carrier 128*a*, releases the latch 154*a*, and lowers the carrier 128*a* to the lowered position. While moving in the reverse direction from the second position to the first position, the actuator 116*a* raises the carrier 128*a*, locks the latch 154*a*, and disengages from the carrier 128*a*.

Preferably, the actuator 116*a* is supported separate from the rail 120*a*. In the preferred configuration, the actuator 116*a* is supported from the floor or base 172*a* of the workstation 114*a*. The actuator 116*a* has a cam follower or roller 178*a* connected to one end of a rotatable crank arm 176*a*. The cam follower is engageable with a cam surface 140*a* formed on the carriage 128*a*. The cam follower 178*a* is engageable with the cam surface 140*a* when the carriage 128*a* is stopped at the workstation 114*a*. Preferably, the cam follower 178*a* is in the form of a roller having an inner cylindrical spool surface positioned between radially enlarged flange members capable of guiding and maintaining the carrier 128*a* in operative contact with the cam follower 178*a* as the carrier 128*a* is moved between the raised position and the lowered position. In the preferred configuration, the cam surface 140*a* is formed as a bottom surface of the carrier 128*a*.

Figure 9C:
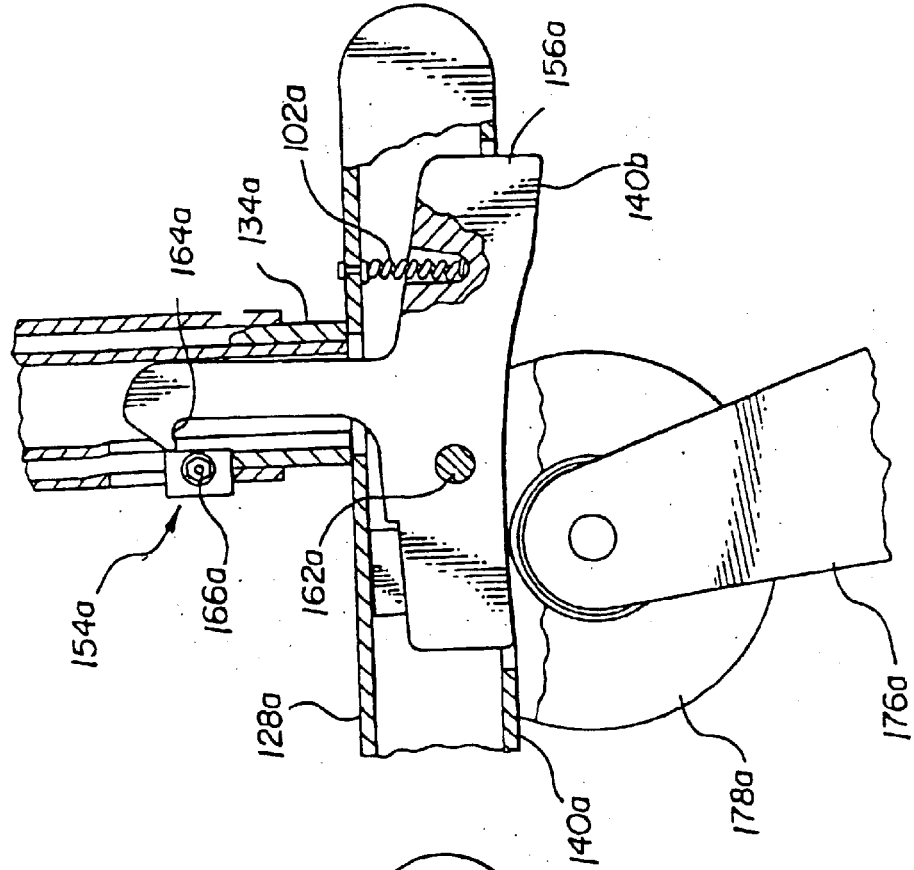
Figure 9B:
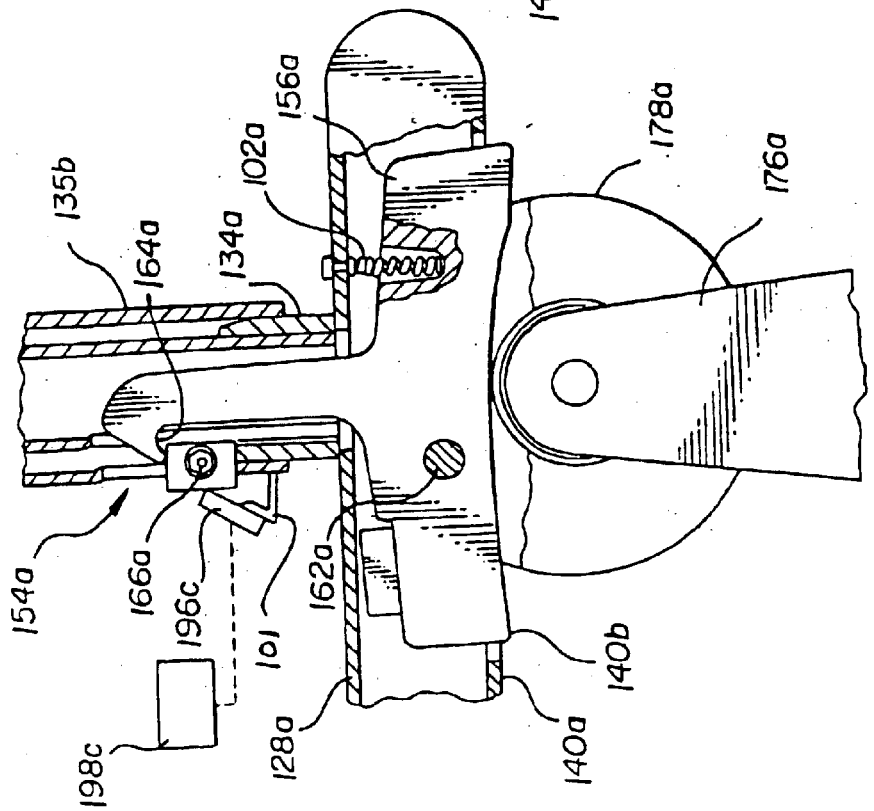
Figure 11:
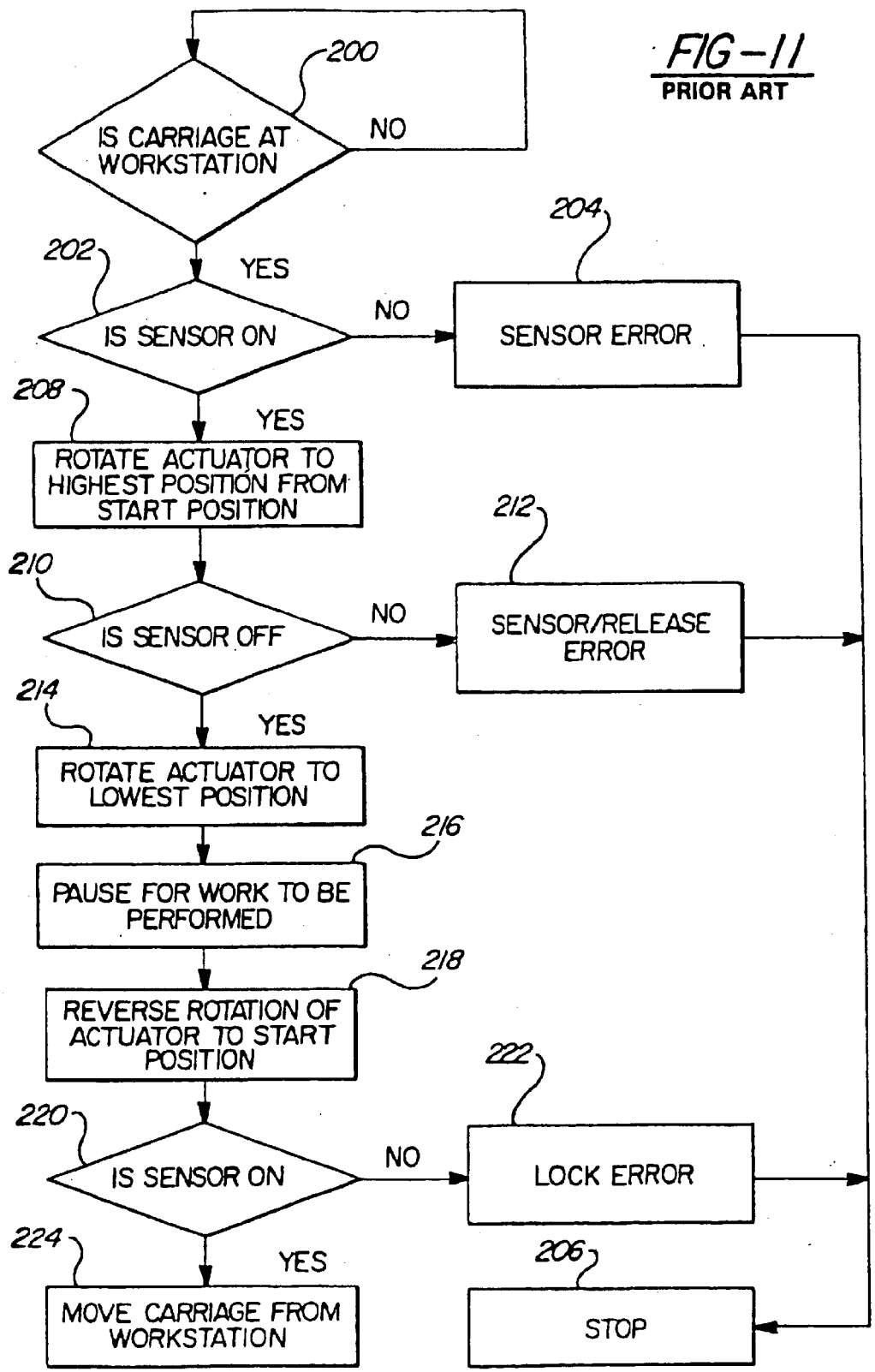
FIG. 11 is a simplified flow diagram of a control method for a lowerator according to the present invention.

Referring now to FIGS. 7–9C, and more particularly to FIGS. 9A–9C, the preferred embodiment of the latch 154*a* includes a second cam engaging surface 140*b* for actuating the latch between the locked position and the released position. The latch 154a is rotated in response to engagement of the second cam surface 140b by the cam follower 178a as the cam follower 178a simultaneously moves along the first and second cam surfaces 140a, 140b. In the illustrated embodiment, the latch 154a is pivotally connected to the carrier 128a. A pair of telescoping posts or vertical elements 134a connect the carrier 128a to the trolley 126a. Slide blocks or bearing blocks 130a are enclosed within the telescoping posts 134a to prevent infiltration of foreign matter, while guiding movement of the carrier 128a with respect to the trolley 126a.

Figure 10:
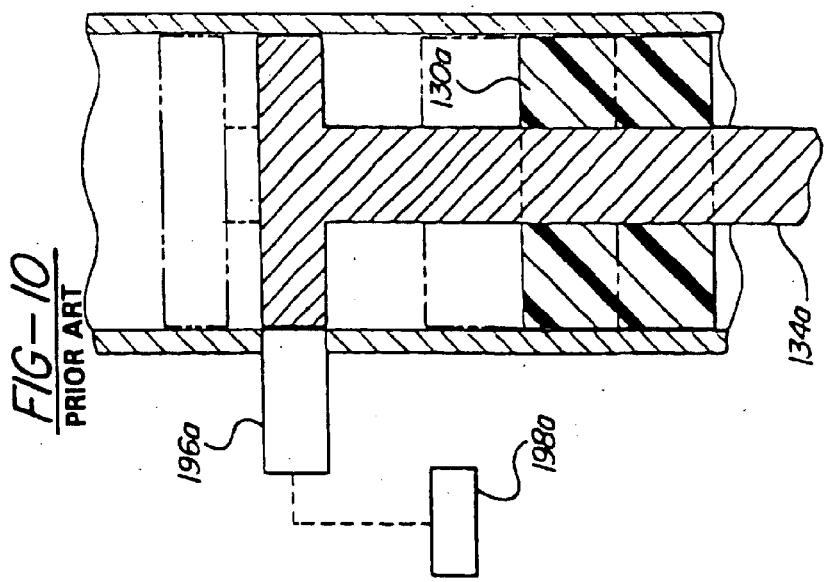
FIG. 10 is a simplified schematic diagram of a vertical position sensor according to the present invention.

In the preferred configuration, best seen in FIGS. 9A, 9B and 10, at least one position sensor 196a, 196b, and 196c is supported with respect to the telescoping post 134a for generating a signal corresponding to a retracted and locked position of the post (illustrated in FIG. 10 in solid line). The position sensor 196a can be supported with respect to the post 134a to sense the position of the telescoping portion of the post 134a relative to the stationary portion 135a, as shown in FIG. 10. Alternatively or additionally, the sensor 196b can be supported with respect to the telescoping portion of the post 134b to sense the position of a surface 167 of the latch 154b, as shown in FIG. 9A. The sensor 196b can be mounted to the stationary portion 135b with a bracket 199. Alternatively or additionally, the sensor 196c can be supported with respect to the telescoping portion of the post 134c to sense the position of a tip 169 of the latch 154c, as shown in FIG. 9B. The sensor 196c can be mounted to the stationary portion 135b of the post 134c with a bracket 101. The sensors 196b and 196c can be positioned approximately one eighth of an inch (1/8") away from the surface 167 and the tip 169, respectively, when the latch 154A is in a locked position. The sensors 196a, 196b and 196c are shown schematically in FIGS. 10, 9A and 9B respectively. Control means 198a, 198b, and 198c such as one or more control circuits, is provided for receiving the signal from one or more of the position sensors 196a, 196b, and 196c for processing signals in accordance with a program stored in memory. Means 100a is provided for sensing if the carriage or workpiece conveyance means 110a is at the workstation 114a. If the carrier 128a is at the workstation 114a, the control means 198a (FIGS. 7 and 10) determines if the latch 154a is in the locked position. If the latch 154a is not in the locked position, the control means 198a generates an error signal. If the latch 154a is in the locked position, the control means 198a actuates the actuator 116a in a first direction of travel moving from the first or start position to an intermediate position. When the actuator 116a is in the intermediate position, the control means 198a determines if the latch 154a has been released from the locked position. If the latch 154a is still in the locked position when the actuator 116a is in the intermediate position, the control means 198a generates an error signal. If the latch 154a is in the released position when the actuator 116a is in the intermediate position, the control means 198a continues actuation of the actuator 116a from the intermediate position to a second position causing the carrier 128a to move from the raised position to the lowered position. After work has been performed on the workpiece at the workstation 114a when the carrier 128a is in the lowered position, the control means 198a actuates the actuator 116a in a second direction of travel to move from the second position to the first position. When the actuator 116a has returned to the first position, the control means 198a determines if the carrier 128a is in the raised and locked position through the position sensor 196a. If the carrier 128a is not in the raised and locked position when the actuator 116a is in the first position, the control means 198a generates an error signal. If the carrier 128a is in the raised and locked position when the actuator 116a is in the first position, the control means 198a generates a signal for activating the motor driven trolley 126a for moving the carriage 128a from the workstation 114a.

In operation, conveying means such as trolley 126a is driven along rail means defining a path of travel with respect to a workstation 114a. The conveying means includes a carrier 128a for supporting at least one workpiece for delivery to the workstation 114a. As the trolley 126a and carrier 128a approach the workstation 114a, the carrier 128a operably engages guide means 186a for aligning and orienting the carrier 128a in the proper position as the carrier 128a enters the workstation 114a for operative engagement with the lowerator 118a located at the workstation 114a. The guide means 186a can include a pair of converging guide rails to direct the leading edge of the carrier 128a into the proper position as the carrier 128a enters the workstation 114a, and/or can include a pair of rollers 188a rotatably supported on posts 190a for guiding the leading edge of the carrier 128a into the proper orientation as it enters the workstation 114a.

When the trolley 126a has reached a predetermined position at the workstation 114a, the motor driven trolley 126a is stopped and a signal is generated by a sensor 100a indicating that the carrier 128a is at the workstation. The signal is received by the control means 198a and processed according to a control program stored in memory. The control program can include the steps illustrated in FIG. 11. Initially, the program determines if the carrier 128a is at the workstation in query step 200. If a signal indicating that the carrier 128a is at the workstation 114a is not received, the program branches back to reiterate the same query in step 200. When a signal is received from the sensor 100a indicating that the carrier 128a is at the workstation 114a, the program continues to the next query step 202 to determine if the position sensor 196a indicates that the carrier 128a is in the raised and locked position. The position sensor 196a can be in the form of a proximity sensor as illustrated in FIG. 10 positioned appropriately to operatively indicate the presence of a radially extending metal portion of the post 134a when in the raised and locked position as illustrated in solid line. If the position sensor 196a is not generating a signal, the control program branches to generate an error signal in step 204 indicating that a sensor failure has occurred. After indicating that there is a sensor failure, the program continues to step 206 where further operations are stopped pending operator determination of the cause of the sensor error reported in step 204. If a signal is received from the position sensor 196a indicating that the carrier 128a is in the raised and locked position, the program continues on to step 208 where the motor 182a is activated in order to drive the lifter arm 176a through gear box 184a to bring the cam follower or roller 178a into operative engagement with the first cam surface 140a formed on the bottom of the carrier 128a. Preferably, the lifter arm 176a is driven in a first rotational direction and engages the bottom of the carrier 128a prior to reaching the upper limit of travel through the defined arc of rotation. As best seen in FIG. 9A, as the lifter arm 176a continues to rotate from the start position, and when at approximately 16° of rotation, the roller 178a has lifted the carrier 128a a sufficient distance to relieve the weight from the latch 154a, or approximately 0.375 inches. As the roller 178a is raising the carrier 128a, the roller 178a simultaneously engages the second cam surface 140a as the roller 178a continues to engage the first cam surface 140a. The lifting motion of the carrier 128a raises the latch 154a a sufficient distance to remove the pin 166a from the pin-receiving portion 164a of the latch arm 156. As the carrier 128a is being lifted by the roller 178a, the outwardly extending metal portion of the post 134a is also raised and moved toward the position shown in phantom in FIG. 10. As the roller 178a reaches the upper limit of travel, the radially outwardly extending metal portion of the post 134a reaches the position shown in phantom and the signal from the position sensor 196a is lost or discontinued. The uppermost position of the roller 178a is shown in FIG. 9B where the roller 178a has continued simultaneous contact with the first and second cam surfaces 140a, 140b and is in the process of rotating the latch arm 156a about the pivot 162a to unlatch the carrier 128a from the trolley 126a. When in this uppermost or intermediate position, the control program proceeds to the next query step 210 to determine if the position sensor signal has been discontinued. If the signal from the position sensor 196a is still present, the program branches to step 212 to indicate a sensor and/or release error, since the carrier 128a has not been raised a sufficient distance to unlatch the carrier 128a from the trolley 126a and continued movement would therefore cause damage to the conveying structure. The program then continues on to the stop step 206 where no further action is taken until an operator determines the cause of the error. If the signal from the position sensor 196a has been discontinued, the control program continues on to step 214 where rotation of the lever arm 176a continues without stopping through the intermediate position to rotate the actuator to the lowest position placing the carrier 128a in the position shown in phantom in FIG. 7. As the roller 178a passes through the intermediate position, the simultaneous engagement with the first and second cam surfaces 140a, 140b rotates the lever arm 156a a sufficient distance to completely release the pin 166a and bypass the pin as the carrier 128a is lowered. The position of the roller 178a illustrated in FIG. 9C is approximately 45° from the start position and the carrier 128a has been lowered approximately 0.375 inches down from the fully raised position. When the carrier 128a is in the lowest position, work is performed on the workpiece or workpieces that have been transferred to the workstation 114a. After completion of the work being performed at the workstation 114a, an appropriate signal is sent to the control means 198a and the motor 182a is activated in the reverse direction to move the lifter arm 176a through the gear box 184a from the lowest or second position back toward the first or start position. The pause for work to be performed is illustrated in step 216 of the control program followed by step 218 indicating reverse rotation of the actuator to the start position. When rotating in the reverse direction, the roller 178a passes through the reverse order of movement previously described, first reaching the position illustrated in FIG. 9C, then FIG. 9B, followed by FIG. 9A, and finally back to the start position illustrated in FIGS. 7 and 8. When in the start position, the radially outwardly extending metal portion of the post 134a has returned to the solid line position illustrated in FIG. 10, and the control program continues to query step 220 to determine if the position sensor 196a is generating a signal to the control means 198a. If no signal is received from the position sensor 196a, the control program branches to step 222 where an error signal is generated indicating a sensor or lock error. The program then continues on to the stop step 206 where no further action is taken until the cause of the error is determined by an operator. If the signal from the position sensor 196a is received by the control means 198a, the program branches to the step 224 allowing the motor trolley 126a to be energized to remove the carrier 128a from the workstation 114a. Preferably, biasing means 102a is provided for urging the lever 156a toward the unlocked position of rotation with respect to pivot pin 162a. In the preferred configuration, the lower portion of the carrier 128a is formed as a box beam having a cutout portion for receiving the rotatable latch arm 156a.

The present invention discloses a simple, efficient, and reliable assembly system including an overhead rail means defining a path of travel with respect to a workstation, and means for conveying a workpiece along the rail means. The conveying means according to the present invention includes a carrier for supporting at least one workpiece for delivery to the workstation, where the carrier is movably associated with the conveying means so as to be vertically positionable between raised and lowered positions with respect to the conveying means. A lowerator according to the present invention automatically moves the carrier between the raised and lowered positions. Latch means is provided for securing the carrier to the conveying means in the raised position for transport to and from the workstation. At least one lifter defines a path of travel in first and second directions, where during movement in the first direction the lifter actuates the latch means to uncouple the carrier from the conveying means, for movement into the lowered position, and where during movement in the second direction the lifter lifts the carrier from the lowered position to the raised position and actuates the latch means so as to secure the carrier to the conveying means in the raised position.

In the preferred configuration, at least two vertically extending members or posts are provided at opposite ends of the carrier, and a latch and position sensor is associated with each post, where the position sensor can signal if the carrier has been raised and placed in the locked position prior to transport out of the workstation, and can also determine if the carrier has been raised sufficiently and unlatched prior to movement of the carrier into the lowered position. If either of the sensors does not generate the appropriate signal, the control program automatically stops further actuation of the lowerator mechanism. It is believed that only one sensor is required for each post in order to determine the position of the vertical member and the latch, however multiple sensors could be provided for additional signals to the control means without departing from the spirit and scope of the present invention.

Figure 12:
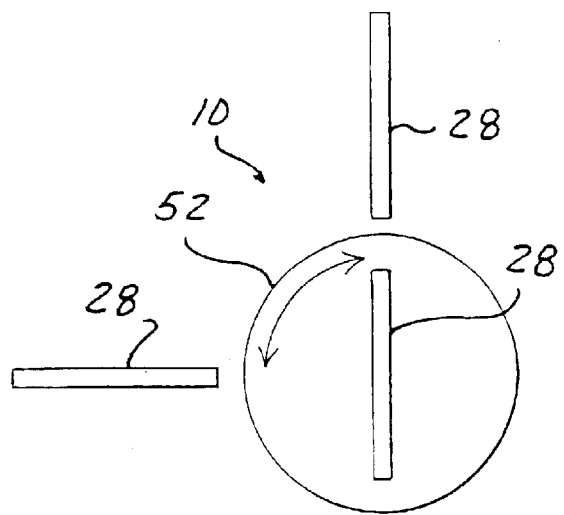
FIG. 12 is a simplified schematic view of a turntable configuration for corners of any desired angle according to the present invention.

Referring now to FIG. 12, a schematic illustration is provided showing a cornering system for the overhead conveyor according to the present invention. The carriage or carrier 28 is delivered to a turntable structure 52 which can be rotated between a first position and a second position to deliver a supported carriage or carrier 28 to another segment of the overhead conveyor system along the path of travel at a different angular orientation with respect to the first segment. The turntable configuration can deliver supported carriers 28 to segments disposed in any angular orientation with respect to one another. In addition, the turntable configuration can be incorporated into a split path of travel for providing alternative paths of travel for processing, or for installation, maintenance, or changeover of the carriers 28 traveling through the overhead conveyor system 10 according to the present invention.

Figure 13:
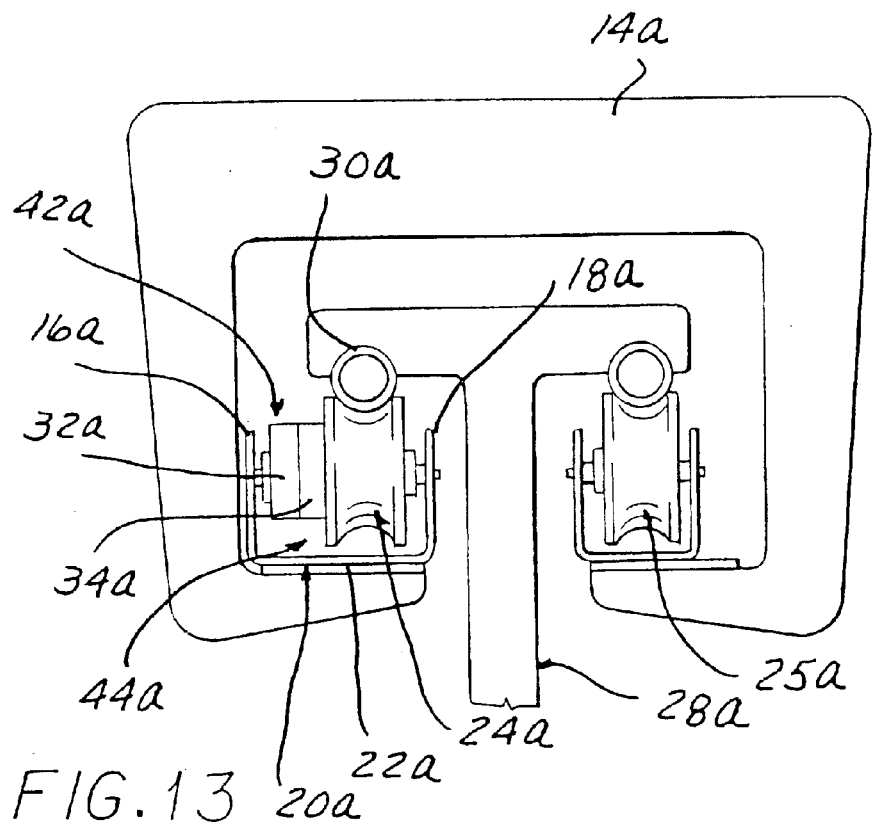
FIG. 13 is a detailed view of an alternative configuration of the upper roller drive and carriage support assembly according to the present invention.

Referring now to FIG. 13, each drive roller 24a is operably connected to a first pulley 32a and a second pulley 34a for simultaneous rotation about a common axis defined by shaft 36a. Shaft 36a is supported by opposing walls 16a, 18a of the open top U-shaped channel 20a. A cover can be provided for enclosing a substantial portion of the open top U-shaped channel 20a while allowing the upper portion of each roller to extend through the cover for engagement with the elongate support member 30a of each carriage or carrier 28a. The motor and gear box or transmission drives one of the rollers 24a and associated first pulley 32a and second pulley 34a in simultaneous rotation about a common axis, similar to that illustrated in FIG. 6. A first drive belt 42a engages with the first pulley 32a driven by the motor and transfers rotational motion to an adjacent first pulley 32a connected to another second pulley 34a and roller 24a for simultaneous rotation about another common axis spaced longitudinally from the rotational axis of the first mentioned motor driven pulley. A second drive belt 44a extends from the second pulley 34a of this roller combination for engagement with a second pulley spaced further longitudinally from the drive motor. The series of interconnected first and second drive belts 42a, 44a extend between adjacent roller assemblies to operably engage with corresponding first and second drive pulleys 32a, 34a to transfer the rotational motion of the motor along at least a portion or segment of the path of travel of the overhead conveyor system 10a according to the present invention. Preferably, the motor located at a workstation is a variable frequency reversible drive or servo drive capable of transporting a carriage or carrier 28 at the desired speed when loaded with a workpiece to be conveyed along the path of travel. One or more motors can be disposed along the longitudinal length of the path of travel for separate independent control of the carriers as the carriers move between one or more workstations located along the path of travel. Standard electric drive motors can be used if desired on return loops where specialized control of the motors is not required.

Referring again to FIG. 13, the support members 30a can be any desired cross-sectional configuration. In the preferred embodiment, the support member 30a includes an exterior surface engagable with a complementary exterior surface of each roller 24a. Preferably, the support member 30a is in the form of an elongate hollow cylindrical member extending along a substantial portion of the longitudinal length of the corresponding carrier 28a. A portion of the exterior cylindrical surface of the support member 30a operably engages with a corresponding, generally complementary concave surface formed on the exterior of the roller 24a. The combination of the exterior cylindrical surface of the support member 30a and the generally complementary concave surface on the exterior of the drive roller 24a and idler roller 25a provides a centered stable orientation for the carrier 28a. In other words, the operable contact with transversely spaced rollers maintains the carrier 28a in a stable position as the carrier 28a moves along the path of travel. The rollers 24a and 25a are positionable along an axis extending transverse to the path of travel.

Figure 14:
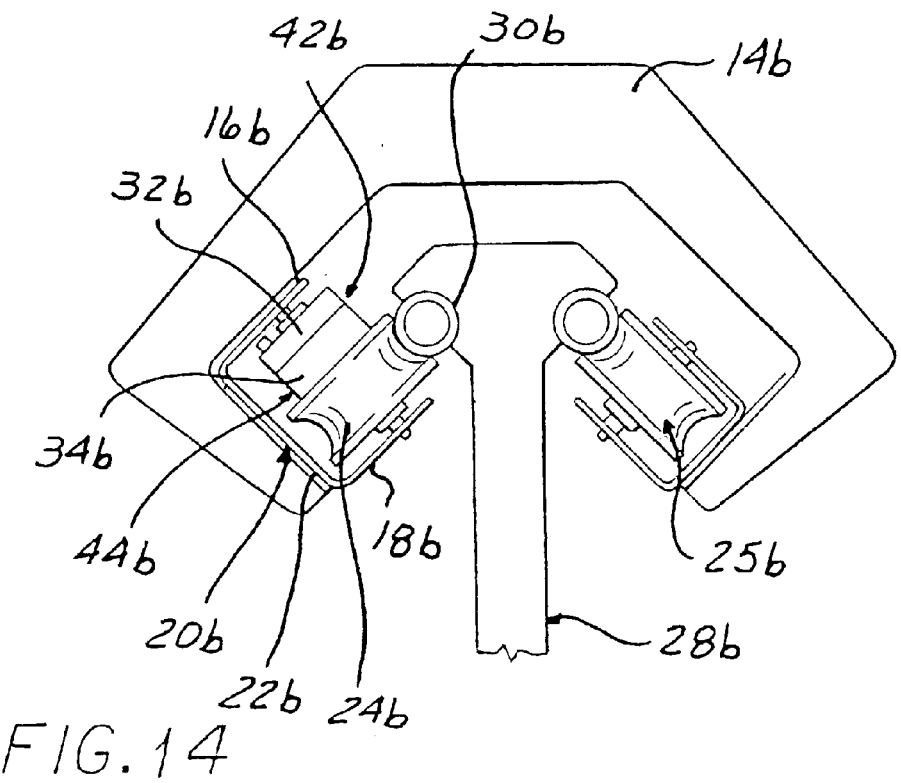
FIG. 14 is a detailed view of another alternative configuration of the upper roller drive and carriage support assembly according to the present invention.

Referring now to FIG. 14, each roller 24b is operably connected to a first pulley 32b and a second pulley 34b for simultaneous rotation about a common axis defined by shaft 36b. Shaft 36b is supported by opposing walls 16b, 18b of the open top U-shaped channel 20b. A cover can be provided for enclosing a substantial portion of the open top U-shaped channel 20b while allowing the upper portion of each roller to extend through the cover for engagement with the elongate support member 30b of each carriage or carrier 28b. The motor and gear box or transmission drives one of the rollers 24b and associated first pulley 32b and second pulley 34b in simultaneous rotation about a common axis, similar to the configuration illustrated in FIG. 6. A first drive belt 42b engages with the first pulley 32b driven by the motor and transfers rotational motion to an adjacent first pulley 32b connected to another second pulley 34b and roller 24b for simultaneous rotation about another common axis spaced longitudinally from the rotational axis of the first mentioned motor driven pulley. A second drive belt 44b extends from the second pulley 34b of this roller combination for engagement with a second pulley spaced further longitudinally from the drive motor. The series of interconnected first and second drive belts 42b, 44b extend between adjacent roller assemblies to operably engage with corresponding first and second drive pulleys 32b, 34b to transfer the rotational motion of the motor along at least a portion or segment of the path of travel of the overhead conveyor system 10b according to the present invention. Preferably, the motor located at workstations is a variable frequency reversible drive or servo drive motor capable of transporting a carriage or carrier 28b at the desired speed when loaded with a workpiece to be conveyed along the path of travel. One or more motors can be disposed along the longitudinal length of the path of travel for separate independent control of the carriers as the carriers move between one or more workstations located along the path of travel. Standard electric drive motors can be used if desired on return loops where specialized control of the motors is not required.

Referring again to FIG. 14, the support members 30b can be any desired cross-sectional configuration. In the preferred embodiment, the support member 30b includes an exterior surface engagable with a complementary exterior surface of each roller 24b. Preferably, the support member 30b is in the form of an elongate hollow cylindrical member extending along a substantial portion of the longitudinal length of the corresponding carrier 28b. A portion of the exterior cylindrical surface of the support member 30b operably engages with a corresponding, generally complementary concave surface formed on the exterior of the roller 24b. The combination of the exterior cylindrical surface of the support member 30b and the generally complementary concave surface on the exterior of the drive roller 24b and idler roller 25b provides a centered stable orientation for the carrier 28b. In other words, the operable contact with transversely spaced rollers maintains the carrier 28b in a stable position as the carrier 28b moves along the path of travel.

Referring now to FIGS. 15–20, an overhead conveyor system 10c according to the present invention includes an overhead support frame 12c of any configuration suitable for supporting the loads to be transported along the path of travel and allowing sufficient clearance for the work pieces to be processed. The support frame structures are conventional and well known to those skilled in the art. The frame 12c through appropriate brackets 14c support opposing sidewalls 16c, 18c defining a channel or slot therebetween. In the preferred embodiment, the opposing walls 16c, 18c can be part of a U-shaped channel 20c supported by the brackets 14c along a lower wall 22c extending between the opposing walls 16c, 18c to define an open upper end extending along the entire longitudinal length of the U-shaped channel 20c. The U-shaped channel 20c defines a path of travel for the overhead conveyor system 10c. A plurality of rollers 24c are rotatably mounted in fixed locations spaced along the path of travel. At least one motor 26c is provided for driving at least a portion of the plurality of rollers 24c in rotation. At least one carriage or carrier 28c is supported on the plurality of rollers 24c for movement along the path of travel in response to rotation of the rollers 24c by the motor 26c. Each carriage or carrier 28c has at least one elongate support member 30c extending along at least a portion of the longitudinal length of the carriage or carrier between the upstream end and the downstream end of the carriage. The at least one elongate support member 30c is continuously engagable with at least two rollers 24c simultaneously while the supported carriage 28c moves along the path of travel.

Figure 15:
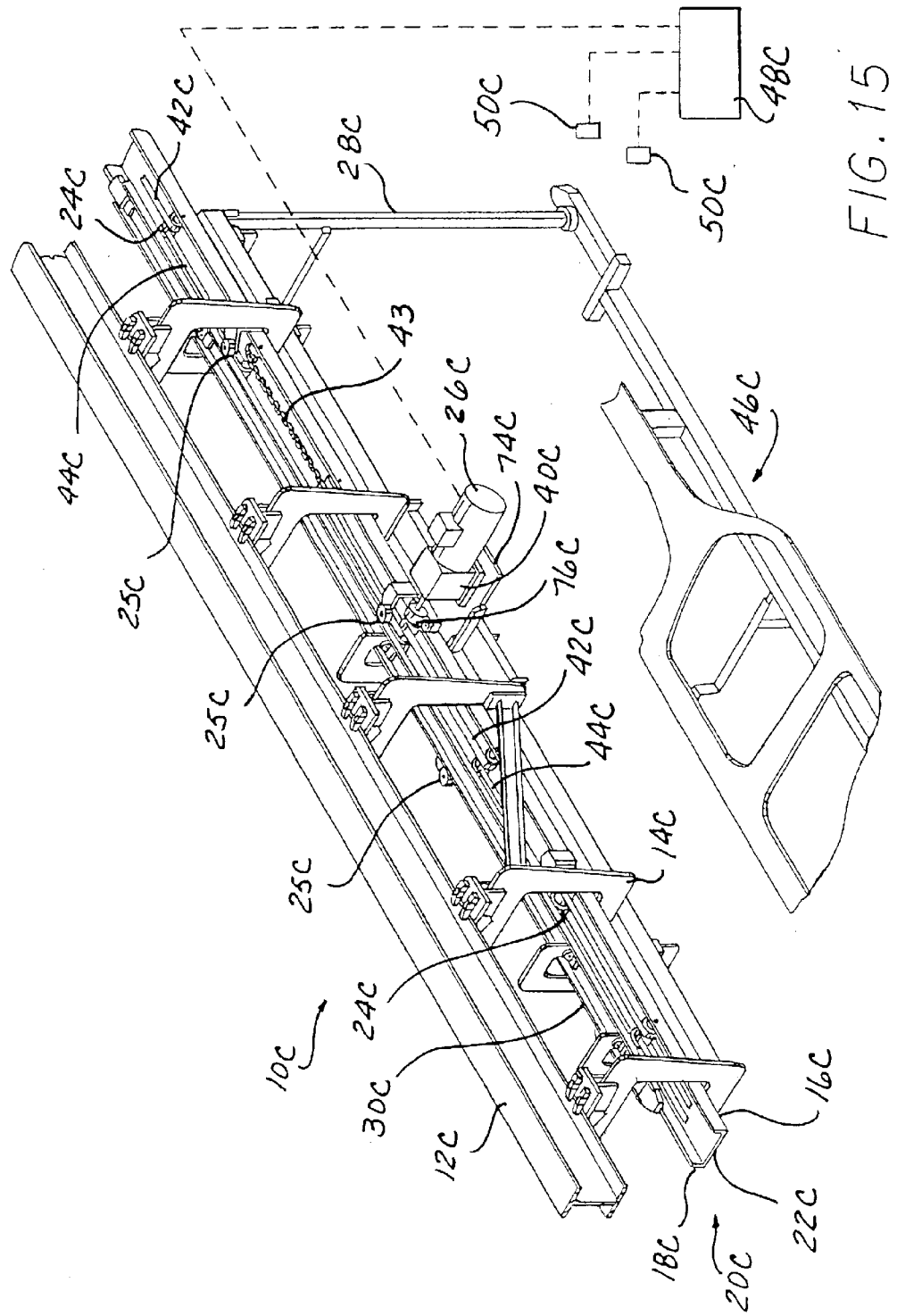
FIG. 15 is a perspective view of an overhead conveyor system according to a second embodiment of the present invention.
Figure 16:
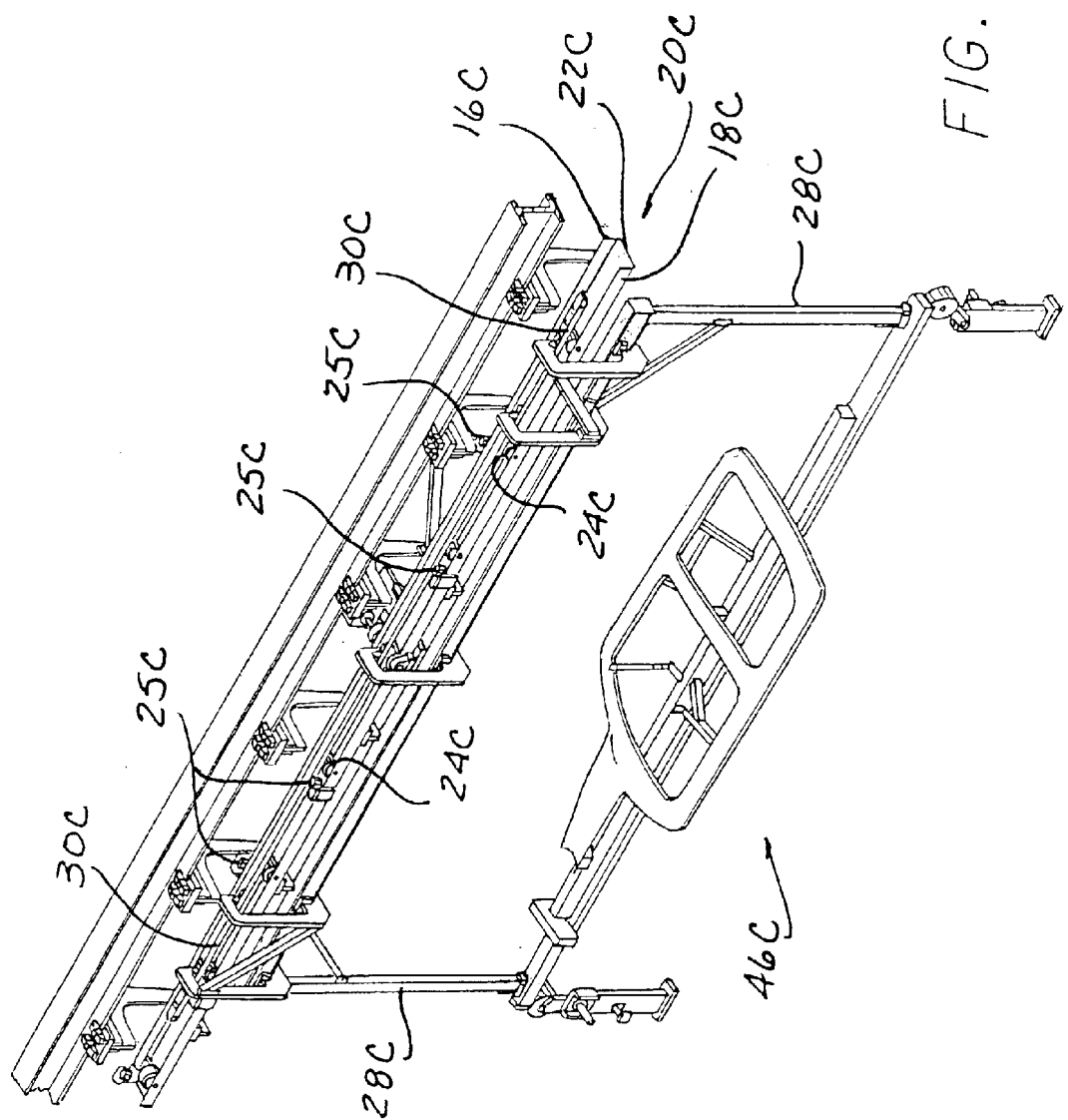
FIG. 16 is a perspective view of an opposite side of the overhead conveyor system according to the second embodiment of the present invention.

The plurality of rollers of an individual frame 12c can be operably associated with respect to one another to rotate substantially in unison. FIGS. 1–6 show an embodiment of the invention including a plurality of belts 42, 42a, 44, and 44a for operably associating two adjacent rollers with respect to one another. FIG. 18 illustrates an embodiment of the invention where one belt 41 operably associates a plurality of rollers with respect to one another at one workstation. FIG. 15 illustrates an embodiment of the invention where a chain 43 is mounted with respect to adjacent rollers 24c instead of a belt. Any combination of belts and chains, or multiple or single belts/chains can rotate one or more of the rollers.

Figure 19:
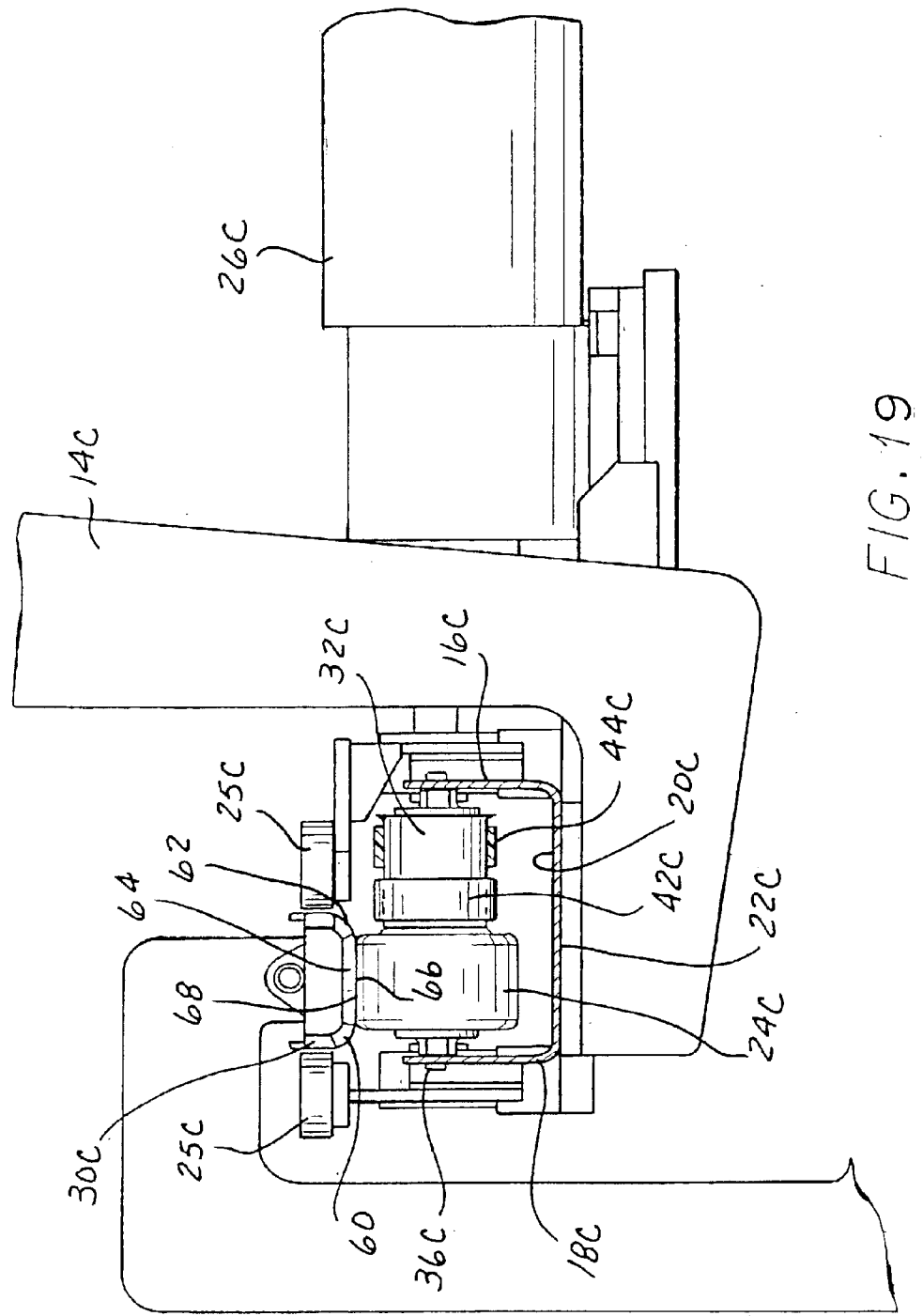
FIG. 19 is a detailed cross-sectional view of an alternative configuration of the upper roller drive and carriage support assembly according to the present invention.

Referring now to FIG. 19, each roller 24c can be operably connected to a pulley 32c for rotation about an axis defined by shaft 36c. Shaft 36c is supported by opposing walls 16c, 18c of the open top U-shaped channel 20c. A cover can be provided for enclosing a substantial portion of the open top U-shaped channel 20c while allowing the upper portion of each roller 24c to extend through the cover for engagement with the elongate support member 30c of each carriage or carrier 28c. As best seen in FIG. 15, the motor 26c, through an appropriate gear box or transmission 40c, drives one of the rollers 24c. As best seen in FIG. 20, bearing means 70c can support an end 72c of the shaft 36c. Bearing means 70c can be positionable outside of the channel 20c and mounted on a support member 74c. Second bearing means 76c can be positionable on an opposite side of the channel 20c with respect to the bearing means 74c to support the shaft 36c.

The first pulley 32c can be operably associated with a first drive belt 42c. The first pulley 32c can be driven by the motor 26c and transfer rotational motion to an adjacent, second pulley 32c spaced longitudinally from the first pulley 32c with respect to the path of travel. A second drive belt 44c can extend from the second pulley 32c for engagement with a third pulley 34c spaced further longitudinally from the drive motor 26c than the second pulley 32c. The series of interconnected first and second drive belts 42c, 44c extend between adjacent roller assemblies to operably engage with corresponding drive pulleys 32c, 34c to transfer the rotational motion of the motor 26c along at least a portion or segment of the path of travel of the overhead conveyor system 10c according to the present invention. Preferably, the motor 26c is a variable frequency reversible drive capable of transporting a carriage or carrier 28c at the desired speed when loaded with a workpiece to be conveyed along the path of travel. One or more motors 26c can be disposed along the longitudinal length of the path of travel for separate independent control of the carriers as the carriers move between one or more workstations located along the path of travel.

The support member 30c can be any desired cross-sectional configuration. In one embodiment, the support member 30c includes an exterior surface engagable with a complementary exterior surface of each roller 24c. The support member 30c can be in the form of an elongate channel member having sidewalls 60 and 62 and lower wall 64 extending along a substantial portion of the longitudinal length of the corresponding carrier 28c. A portion of an exterior surface 66 of the support member 30c operably engages with a corresponding surface 68 formed on the exterior of the roller 24c.

The brackets 14c can support one or more alignment rollers 25c. Alignment rollers 25c can be individually supported by brackets 14c to engagingly support a sidewall 60 or a sidewall 62. Preferably, alignment rollers 25c are alternated such that a first alignment roller 25c engaged with a first bracket 14c supports sidewall 60 and a second alignment roller 25c engaged with a second bracket 14c downstream of the first bracket supports a sidewall 62. The alignment rollers 25c provide an alignment function to the carrier 28c in order to center the support member 30c on the rollers 24c.

At least one workstation 46c can be provided along the path of travel of the overhead conveyor system 10c. The variable frequency drive motor 26c for this segment of the overhead conveyor system can be controlled by a controller 48c, schematically illustrated in FIG. 15, in response to one or more sensors 50c, schematically illustrated. The sensors 50c can be positioned at floor level along with any control panel required for the controller 48c for ease of maintenance. The sensors 50c can be positioned adjacent the entry to the workstation 46c for signaling the controller 48c to slow the variable frequency drive motor 26c as the carrier 28c enters the workstation 46c. Additional sensors can be appropriately positioned in order to accurately stop the carrier 28c at the desired position at the workstation 46c.

The carriage or carrier 28c can include a generally horizontal member extending between two vertically extending and telescoping support members. The horizontal support member can support interchangeable antlers for carrying various configurations of workpieces between the workstations for processing. The horizontal member and antlers can be moved from a raised, transport position, to a lowered transfer position when stopped at the workstation. Additional details regarding the structural configuration and operation of the lower portion of the carriage or carrier 28c can be obtained from the disclosure of U.S. Ser. Nos. 09/767,931, 09/767,929, and 09/768,090 all filed on Jan. 23, 2001 which are incorporated herein by reference.

Referring now to FIG. 17, an embodiment of the invention is shown where a plurality of motors 26d–26h are positioned along the path of travel including a plurality of workstations 46d–46f to selectively drive at least one of the plurality of rollers. Each motor can drive an individual roller to move the carriage 28d along the path of travel. The motors can be positioned equally spaced apart from one another along the path of travel, or can be spaced from each other at different distances along the path of travel. In an embodiment of the invention having a plurality of motors, the rollers can be selectively rotated. Specifically, the rollers associated with the motors can be rotatably driven and freely rotatable rollers can be positioned between the driven rollers. In such an embodiment of the invention, the freely rotatable, or idler rollers, can support the elongate support member during movement along the path of travel.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An overhead conveyor system comprising:

a plurality of rollers rotatably mounted in fixed stationary overhead locations spaced along a path of travel;

at least one motor for driving the plurality of rollers in rotation;

at least one carriage supported on the rollers for movement along the path of travel in response to rotation of the rollers, each of the at least one carriage having at least one elongate support member continuously engageable with at least two rollers simultaneously while the at least one carriage moves along the path of travel, each of the at least one carriage including a nest portion for carrying a workpiece to be processed, the nest portion vertically movable toward and away from the at least one elongate support member between a raised position and a lowered position at a workstation; and transverse stabilizing means defined by the plurality of rollers contacting the at least one elongate support member for stabilizing the at least one elongate support member against transverse movement, wherein the transverse stabilizing means includes the at least one elongate support member including first and second transversely spaced elongate support members, and the plurality of rollers including first and second roller paths spaced transversely from one another for supporting the first and second transversely spaced elongate support members with the carriage extending downward between the first and second roller paths for supporting the nest portion.

2. The overhead conveyor system of claim 1 further comprising:

each roller operably connected to a common shaft with a driven pulley and a drive pulley; and a plurality of belts engaged between adjacent rollers connecting the driven pulley of one roller with the drive pulley of an adjacent roller for transmitting rotation from a single motor to the plurality of rollers along the path of travel.

3. The overhead conveyor system of claim 1 further comprising:

the plurality of rollers having contoured surfaces formed thereon; and the at least one elongate support member having a complementary surface operably engagable with the contoured surfaces of the plurality of rollers.

4. The overhead conveyor system of claim 3 further comprising:

the plurality of rollers including a first set of rollers spaced transversely with respect to the path of travel from a second set of rollers forming an open slot therebetween, the first and second sets of rollers having contoured surfaces formed thereon; and each carriage extending vertically downward through the open slot between the first and second sets of rollers, and the at least one elongate support member including first and second elongate support members having complementary surfaces operably engagable with the contoured surfaces formed on the first and second sets of rollers.

5. The system of claim 1 further comprising the plurality of rollers of the first and second roller paths having generally horizontal axes of rotation.

6. The system of claim 1 further comprising the plurality of rollers of the first and second roller paths having axes of rotation extending at an angle with respect to one another.

7. The system of claim 1 further comprising the first roller path including rollers driven by the at least one motor, and the second roller path including idler rollers.

8. An overhead conveyor system comprising:

a plurality of rollers rotatably mounted along a path of travel;

an elongate support member continuously engageable with at least two rollers and moveable along the path of travel in response to rotation of at least one of the plurality of rollers;

a nest portion connected to the elongate support member for carrying a workpiece to be processed, the nest portion vertically movable with respect to the elongate support member between a raised position and a lowered position at a workstation; and transverse stabilizing means defined by the plurality of rollers contacting the elongate support member for stabilizing the elongate support member against transverse movement, wherein the transverse stabilizing means includes the at least one elongate support member including first and second transversely spaced elongate support members, and the plurality of rollers including first and second roller paths spaced transversely from one another for supporting the first and second transversely spaced elongate support members with the carriage extending downward between the first and second roller paths for supporting the nest portion.

9. The system of claim 8, wherein the plurality of rollers are operably associated with respect to one another to rotate substantially in unison.

10. The system of claim 9 further comprising:

at least one belt operably associating the plurality of rollers with respect to one another.

11. The system of claim 9 further comprising:

at least one chain operably associating the plurality of rollers with respect to one another.

12. The system of claim 9 further comprising:

a plurality of belts, each of the plurality of belts operably associating two rollers positioned spaced from one another along the path of travel.

13. The system of claim 8 further comprising:

at least one motor for rotating at least one of the plurality of rollers.

14. The system of claim 13, wherein in the at least one motor further comprises:

a plurality of motors, each of the plurality of motors positionable along the path of travel for selectively driving at least one of the plurality of rollers.

15. The system of claim 8, wherein the elongate support member is substantially cylindrical.

16. The system of claim 8, wherein the elongate support member is substantially hollow.

17. The system of claim 8, wherein the elongate support member further comprises:

first and second substantially cylindrical members.

18. The system of claim 8 further comprising:

means for moving the elongate member between a first section of the path of travel and a second section of the path of travel, where the first and second sections of the path are at an angular, non-linear, orientation with respect to one another.

19. The system of claim 8 further comprising:

the plurality of rollers having contoured surfaces formed thereon; and the elongate support member having a complementary surface operably engagable with the contoured surfaces of the plurality of rollers.

20. The system of claim 19 further comprising:
the plurality of rollers including a first set of rollers spaced transversely with respect to the path of travel from a second set of rollers forming an open slot therebetween, the first and second sets of rollers having contoured surfaces formed thereon; and
each nest supported below the plurality of rollers and extending vertically downward through the open slot between the first and second sets of rollers, and the elongate support member including first and second elongate support members having complementary surfaces operably engagable with the contoured surfaces formed on the first and second sets of rollers.

21. The system of claim 19 further comprising:
each nest hanging to extend vertically below the plurality of rollers through a substantially C-shaped bracket connected to the at least one elongate support member.

22. The system of claim 8 further comprising the plurality of rollers of the first and second roller paths having generally horizontal axes of rotation.

23. The system of claim 8 further comprising the plurality of rollers of the first and second roller paths having axes of rotation extending at an angle with respect to one another.

24. The system of claim 8 further comprising the first roller path including rollers driven by the at least one motor, and the second roller path including idler rollers.

25. An overhead conveyor system comprising:
a plurality of rollers rotatably mounted along a path of travel, wherein the plurality of rollers include a first set of rollers rotatably driven to move the elongate support member along the path of travel, and a second set of rollers freely rotatable to support the elongate support member during movement along the path of travel;
an elongate support member continuously engageable with at least two rollers and moveable along the path of travel in response to rotation of at least one of the plurality of rollers; and
transverse stabilizing means defined by the plurality of rollers contacting the elongate support member for stabilizing the elongate support member against transverse movement, wherein the transverse stabilizing means includes the elongate support member including first and second transversely spaced elongate support members, and the plurality of rollers including first and second roller paths spaced transversely from one another for supporting the first and second transversely spaced elongate support members with the carriage extending downward between the first and second roller paths for supporting the nest portion.

26. The system of claim 25, wherein a first roller of the first set of rollers and a second roller of the second set of rollers are positionable along a common axis extending transverse to the path of travel.

27. The system of claim 25, wherein a first roller of the first set of rollers and a second roller of the second set of rollers are positionable adjacent to one another along the path of travel.

28. The system of claim 25, wherein at least two rollers from the second set of rollers are positionable between two rollers from the first set of rollers along the path of travel.

29. The system of claim 25 further comprising the plurality of rollers of the first and second roller paths having generally horizontal axes of rotation.

30. The system of claim 25 further comprising the plurality of rollers of the first and second roller paths having axes of rotation extending at an angle with respect to one another.

31. The system of claim 25 further comprising the first roller path including rollers driven by the at least one motor, and the second roller path including idler rollers.

32. An overhead conveyor system comprising:
a plurality of rollers rotatably mounted in fixed stationary overhead locations spaced along a path of travel;
at least one motor for driving the plurality of rollers in rotation;
at least one carriage supported on the rollers for movement alone the path of travel in response to rotation of the rollers, each of the at least one carnage having at least one elongate support member continuously engageable with at least two rollers simultaneously while the at least one carriage moves alone the path of travel, each of the at least one carriage including a nest portion for carrying a workpiece to be processed, the nest portion vertically movable toward and away from the at least one elongate support member between a raised position and a lowered position at a workstation; and
transverse stabilizing means defined by the plurality of rollers contacting the at least one elongate support member for stabilizing the at least one elongate support member against transverse movement, wherein the transverse stabilizing means includes the at least one elongate support member including a U-shaped channel support member having in cross-section a base wall interposed between first and second outwardly extending side walls at opposite transverse ends of the base wall, and the plurality of rollers including a first set of rollers having generally horizontal axes of rotation for supporting the base wall of the channel support member and a second set of rollers spaced transversely from one another having generally vertical axes of rotation for engaging the first and second side walls on opposite transverse sides of the channel for transversely stabilizing the support member.

33. The overhead conveyor system of claim 32 further comprising:
each carriage banging to extend vertically below the plurality of rollers through a substantially C-shaped bracket connected to the at least one elongate support member.

34. An overhead conveyor system: comprising:
a plurality of rollers rotatably mounted in fixed stationary overhead locations spaced alone a path of travel;
at least one motor for driving the plurality of rollers in rotation;
at least one carriage supported on the rollers for movement along the path of travel in response to rotation of the rollers, each of the at least one carriage having at least one elongate support member continuously engageable with at least two rollers simultaneously while the at least one carriage moves along the path of travel;
a workstation located along the path of travel;
a nest portion for carrying a workpiece to be processed, the nest portion supported from the at least one elongate support member for vertical movement with respect to the at least one elongate support member between a raised position and a lowered position at the workstation;
at least one sensor operably positionable for sensing the carriage when at the workstation for controlling movement of the carriage at the workstation as the carriage is driven alone the path of travel by rotation of the plurality of rollers; and transverse stabilizing means defined by the plurality of rollers contacting the at least one elongate support member for stabilizing the at least one elongate support member against transverse movement, wherein the transverse stabilizing means includes the at least one elongate support member including first and second transversely spaced elongate support members, and the plurality of rollers including first and second roller paths spaced transversely from one another for supporting the first and second transversely spaced elongate support members with the carriage extending downward between the first and second roller paths for supporting the nest portion.

35. The system of claim 34 further comprising the plurality of rollers of the first and second roller paths having generally horizontal axes of rotation.

36. The system of claim 34 further comprising the plurality of rollers of the first and second roller paths having axes of rotation extending at an angle with respect to one another.

37. The system of claim 34 further comprising the first roller path including rollers driven by the at least one motor, and the second roller path including idler rollers.

38. An overhead conveyor system comprising a plurality of rollers rotatably mounted in fixed stationary overhead locations spaced along a path of travel;

at least one motor for driving the plurality of rollers in rotation;

at least one carriage supported on the rollers for movement along the path of travel in response to rotation of the rollers, each of the at least one carriage having at least one elongate support member continuously engageable with at least two rollers simultaneously while the at least one carriage moves alone the path of travel;

a workstation located along the path of travel;

a nest portion for carrying a workpiece to be processed, the nest portion supported from the at least one elongate support member for vertical movement with respect to the at least one elongate support member between a raised position and a lowered position at the workstation;

at least one sensor operably positionable for sensing the carriage when at the workstation for controlling movement of the carriage at the workstation as the carriage is driven along the oath of travel by rotation of the plurality of rollers; and transverse stabilizing means defined by the plurality of rollers contacting the at least one elongate support member for stabilizing the at least one elongate support member against transverse movement, wherein the transverse stabilizing means includes the at least one elongate support member including a U-shaped channel support member having in cross-section a base wall interposed between first and second outwardly extending side walls at opposite transverse ends of the base wall, and the plurality of rollers including a first set of rollers having generally horizontal axes of rotation for supporting the base wall of the channel support member and a second set of rollers spaced transversely from one another having generally vertical axes of rotation for engaging the first and second side walls on opposite transverse sides of the channel for transversely stabilizing the support member.

39. An overhead conveyor system comprising:

a plurality of rollers rotatably mounted along a path of travel;

an elongate support member continuously engageable with at least two rollers and moveable alone the oath of travel in response to rotation of at least one of the plurality of rollers;

a nest portion connected to the elongate support member for carrying a workpiece to be processed, the nest portion vertically movable with respect to the elongate support member between a raised position and a lowered position at a workstation; and transverse stabilizing means defined by the plurality of rollers contacting the elongate support member for stabilizing the elongate support member against transverse movement, wherein the transverse stabilizing means includes the at least one elongate support member including a U-shaped channel support member having in cross-section a base wall interposed between first and second outwardly extending side walls at opposite transverse ends of the base wall, and the plurality of rollers including a first set of rollers having generally horizontal axes of rotation for supporting the base wall of the channel support member and a second set of rollers spaced transversely from one another having generally vertical axes of rotation for engaging the first and second side walls on opposite transverse sides of the channel for transversely stabilizing the support member.

40. The system of claim 39, wherein the elongate support member defines a channel.

41. An overhead conveyor system comprising:

a plurality of rollers rotatably mounted along a path of travel, wherein the plurality of rollers include a first set of rollers rotatably driven to move the elongate support member along the path of travel, and a second set of rollers freely rotatable to support the elongate support member during movement along the path of travel;

an elongate support member continuously engageable with at least two rollers and moveable along the path of travel in response to rotation of at least one of the plurality of rollers; and transverse stabilizing means defined by the plurality of rollers contacting the elongate support member for stabilizing the elongate support member against transverse movement, wherein the transverse stabilizing means includes the elongate support member including a U-shaped channel support member having in cross-section a base wall interposed between first and second outwardly extending side walls at opposite transverse ends of the base wall, and the plurality of rollers including a first set of rollers having generally horizontal axes of rotation for supporting the base wall of the channel support member and a second set of rollers spaced transversely from one another having generally vertical axes of rotation for engaging the first and second side walls on opposite transverse sides of the channel for transversely stabilizing the support member.

42. An overhead conveyor system comprising:

a plurality of rollers rotatably mounted at fixed stationary positions along a path of travel;

an elongate support member continuously engageable with at least two rollers and moveable along the path of travel in response to rotation of at least one of the plurality of rollers;

a nest portion for carrying a workpiece to be processed, the nest portion support from the elongate support member for vertical movement with respect to the elongate support member between a raised position and a lowered position at a workstation;

at least one sensor for sensing a position of the elongate support member along the path of travel and emitting a signal;

control means for receiving the signal from the at least one sensor and controlling the rotation of the plurality of rollers in response to the signal; and transverse stabilizing means defined by the plurality of rollers contacting the elongate support member for stabilizing the elongate support member against transverse movement, wherein the transverse stabilizing means includes the elongate support member including first and second transversely spaced elongate support members, and the plurality of rollers including first and second roller paths spaced transversely from one another for supporting the first and second transversely spaced elongate support members with the carriage extending downward between the first and second roller paths for supporting the nest portion.

43. The system of claim 42 further comprising the plurality of rollers of the first and second roller paths having generally horizontal axes of rotation.

44. The system of claim 42 further comprising the plurality of rollers of the first and second roller paths having axes of rotation extending at an angle with respect to one another.

45. The system of claim 42 further comprising the first roller path including rollers driven by the at least one motor, and the second roller path including idler rollers.

46. An overhead conveyor system comprising:

a plurality of rollers rotatably mounted at fixed stationary positions along a path of travel;

an elongate support member continuously engageable with at least two rollers and moveable alone the path of travel in response to rotation of at least one of the plurality of rollers;

a nest portion for carrying a workpiece to be processed, the nest portion support from the elongate support member for vertical movement with respect to the elongate support member between a raised position and a lowered position at a workstation;

at least one sensor for sensing a position of the elongate support member along the path of travel and emitting a signal;

control means for receiving the signal from the at least one sensor and controlling the rotation of the plurality of rollers in response to the signal; and transverse stabilizing means defined by the plurality of rollers contacting the elongate support member for stabilizing the elongate support member against transverse movement, wherein the transverse stabilizing means includes the elongate support member including a U-shaped channel support member having in cross-section a base wall interposed between first and second outwardly extending side walls at opposite transverse ends of the base wall, and the plurality of rollers including a first set of rollers having generally horizontal axes of rotation for supporting the base wall of the channel support member and a second set of rollers spaced transversely from one another having generally vertical axes of rotation for engaging the first and second side walls on opposite transverse sides of the channel for transversely stabilizing the support member.

* * * * *

UNITED STATES PATENT AND TRADEMARK OFFICE
CERTIFICATE OF CORRECTION

PATENT NO. : 6,799,673 B2  
DATED : November 8, 2004  
INVENTOR(S) : Velibor Kilibarda It is certified that error appears in the above-identified patent and that said Letters Patent is hereby corrected as shown below:

Title page,  
Item [12], should read: -- United States Patent  
                        Kilibarda --  
Item [75], Inventor, should read: -- Velibor Kilibarda, Birmingham, MI --

Signed and Sealed this

First Day of February, 2005

JON W. DUDAS  
*Director of the United States Patent and Trademark Office*